United States Patent
Aio et al.

(10) Patent No.: US 12,143,218 B2
(45) Date of Patent: Nov. 12, 2024

(54) WIRELESS COMMUNICATION DEVICE AND WIRELESS COMMUNICATION METHOD FOR PERFORMING DATA TRANSMISSION JOINTLY WITH OTHER WIRELESS COMMUNICATION DEVICES

(71) Applicant: Sony Group Corporation, Tokyo (JP)

(72) Inventors: Kosuke Aio, Kanagawa (JP); Ken Tanaka, Tokyo (JP)

(73) Assignee: Sony Group Corporation, Tokyo (JP)

( * ) Notice: Subject to any disclaimer, the term of this patent is extended or adjusted under 35 U.S.C. 154(b) by 288 days.

(21) Appl. No.: 17/623,849

(22) PCT Filed: Apr. 10, 2020

(86) PCT No.: PCT/JP2020/016109
§ 371 (c)(1),
(2) Date: Dec. 29, 2021

(87) PCT Pub. No.: WO2021/005859
PCT Pub. Date: Jan. 14, 2021

(65) Prior Publication Data
US 2022/0360367 A1 Nov. 10, 2022

(30) Foreign Application Priority Data
Jul. 5, 2019 (JP) .................................. 2019-125830

(51) Int. Cl.
*H04L 1/16* (2023.01)
*H04L 1/1607* (2023.01)

(52) U.S. Cl.
CPC .................................. *H04L 1/1671* (2013.01)

(58) Field of Classification Search
CPC ... H04L 1/1671; H04L 1/1614; H04L 1/1685; H04L 1/1864; H04W 72/27; H04W 84/12; H04B 7/024
See application file for complete search history.

(56) References Cited

U.S. PATENT DOCUMENTS

| 2009/0052363 | A1 | 2/2009 | Matsue et al. |
| 2015/0009966 | A1* | 1/2015 | Lee .................. H04L 5/0035 370/336 |

(Continued)

FOREIGN PATENT DOCUMENTS

| CN | 109672512 A | 4/2019 |
| JP | 2009-049704 A | 3/2009 |

(Continued)

OTHER PUBLICATIONS

Sungjin Park et al: "Multi-AP Transmission Procedure", Internet Citation, Mar. 12, 2019 (Mar. 12, 2019), pp. 1-18, XP068159823, Retrieved from the Internet: URL:https://mentor.ieee.org/802.11/dcn/19/11-19-0448-01-0eht multi-ap-transmission-procedure.pptx [retrieved on Mar. 12, 2019].

(Continued)

*Primary Examiner* — Walli Z Butt
(74) *Attorney, Agent, or Firm* — Wolf, Greenfield & Sacks, P.C.

(57) ABSTRACT

In joint transmission using an access point, unnecessary data transmission and occurrence of a waiting time are avoided. A wireless communication devices includes a communication control unit and a signal generation unit. The communication control unit generates control information for requesting communication result information regarding whether reception is successful in a transmission destination device when first joint communication is performed jointly with another wireless communication device. The signal generation unit generates a signal including the control information generated by the communication control unit as a signal for urging second joint communication jointly with the other wireless communication device.

16 Claims, 27 Drawing Sheets

(56) References Cited

U.S. PATENT DOCUMENTS

| | | | |
|---|---|---|---|
| 2018/0049236 A1* | 2/2018 | Sun | H04B 7/0452 |
| 2018/0359016 A1 | 12/2018 | Murakami et al. | |
| 2021/0127290 A1* | 4/2021 | Yang | H04W 72/27 |
| 2023/0048520 A1* | 2/2023 | Murakami | H04B 7/024 |

FOREIGN PATENT DOCUMENTS

| | | |
|---|---|---|
| JP | 2012-160854 A | 8/2012 |
| WO | WO 2016/208151 A1 | 12/2016 |

OTHER PUBLICATIONS

Written Opinion and English translation thereof mailed Jun. 9, 2020 in connection with International Application No. PCT/JP2020/016109.

International Preliminary Report on Patentability and English translation thereof mailed Jan. 20, 2022 in connection with International Application No. PCT/JP2020/016109.

Extended European Search Report issued Jun. 1, 2022 in connection with European Application No. 20835981.0.

International Search Report and English translation thereof mailed Jun. 9, 2020 for International Application No. PCT/JP2020/016109.

Park et al., Efficient Operation for Multi-AP Coordination. IEEE 802.11-19/1143r0, Jul. 4, 2019, [last accessed Jun. 1, 2020], https://mentor.ieee.org/802.11/den/19/11-19-1143-00-00be-efficient-operation-for-multi-apcoordination.pptx, pp. 3-10 (15 pages).

Sungjin Park et al: "Multi-AP Transmission Procedure", IEEE DRAFT;11-19-0804-00-00BE-MULTI-AP-TRANSMISSION-PROCEDURE, IEEE-SA Mentor, Piscataway, NJ USA, vol. 802.11 EHT; 802.11be May 13, 2019 (May 13, 2019), p. 1-14, XP068151150.

Communication pursuant to Article 94(3) EPC dated Feb. 29, 2024 in connection with European Application No. 20835981.0.

* cited by examiner

Fig. 12

| | BLOCK ACK SHARING POLICY (792) | BLOCK ACK INFORMATION (793) |
|---|---|---|
| 001 | ACK IS RECEIVED FROM WIRELESS TERMINAL | — |
| 010 | BLOCK ACK IS RECEIVED FROM WIRELESS TERMINAL AND RECEPTION OF ALL DATA IS SUCCESSFUL | — |
| 011 | BLOCK ACK IS RECEIVED FROM WIRELESS TERMINAL AND RECEPTION OF SOME DATA IS SUCCESSFUL | INFORMATION REGARDING WHETHER RECEPTION CORRESPONDING TO TRANSMISSION DATA IDENTIFIER IS SUCCESSFUL |
| 000 | NOTHING IS RECEIVED FROM WIRELESS TERMINAL | — |

WIRELESS COMMUNICATION DEVICE AND WIRELESS COMMUNICATION METHOD FOR PERFORMING DATA TRANSMISSION JOINTLY WITH OTHER WIRELESS COMMUNICATION DEVICES

CROSS-REFERENCE TO RELATED APPLICATIONS

This application claims the benefit under 35 U.S.C. § 371 as a U.S. National Stage Entry of International Application No. PCT/JP2020/016109, filed in the Japanese Patent Office as a Receiving Office on Apr. 10, 2020, which claims priority to Japanese Patent Application Number JP2019-125830, filed in the Japanese Patent Office on Jul. 5, 2019, each of which is hereby incorporated by reference in its entirety.

TECHNICAL FIELD

The present technology relates to a wireless communication device performing data transmission. Specifically, the present technology relates to a wireless communication device performing data transmission jointly with other wireless communication devices and a processing method therefor.

BACKGROUND ART

In recent years, environments in which a plurality of access points (APs) of wireless local area networks (LANs) are placed in stadiums or homes have been increasing. In such environments, technologies called multi-AP coordination aimed at an improvement in a system throughput or an improvement in reliability jointly between access points have gained attention. In joint transmission which is one of the technologies, a plurality of access points perform joint communication on one wireless terminal (STA: station) using a multiple-input and multiple-output (MIMO) technology. With this technology, multi-dimensional space multiplexing can be realized without increasing the number of antennas annexed to one access point.

As a method of determining retransmission in such joint communication, an example is known in which one access point receives information regarding a data reception result from a wireless terminal, performs retransmission determination based on the information, and subsequently gives an instruction for joint communication to the other access point again (for example, see PTL 1). However, in the Institute of Electrical and Electronics Engineers (IEEE) 802.11 standard, when the access point performing the retransmission determination has failed to receive a reception signal (an ACK or a block ACK) from a wireless terminal, the wireless terminal considers the data reception to have failed. Accordingly, in this case, even when the wireless terminal receives all the jointly communicated data, the wireless terminal considers the data reception to have failed and erroneously determines that the same data is to be retransmitted. Therefore, the access point repeatedly transmits the same data, and thus unnecessary data communication is performed. On the other hand, a scheme for receiving a block ACK again from a wireless terminal by transmitting a block ACK request to the wireless terminal has been proposed (for example, see PTL 2).

CITATION LIST

Patent Literature

[PTL 1]
JP 2012-160854 A
[PTL 2]
JP 2009-049704 A

SUMMARY

Technical Problem

In the above-described technologies of the related art, a block ACK is received again from a wireless terminal by transmitting a block ACK request to the wireless terminal. In this case, however, when the wireless terminal has failed to actually receive data, a time taken to transmit the block ACK request and then wait for a block ACK may be wasted.

The present technology has been devised in view of such a situation and an objective of the present technology is to avoid unnecessary data transmission and occurrence of a waiting time in joint transmission using an access point.

Solution to Problem

The present technology has been devised to solve the above-described problems and a first aspect is a wireless communication method and a wireless communication device including a communication control unit configured to generate control information for requesting communication result information regarding whether reception is successful in a transmission destination device when first joint communication is performed jointly with another wireless communication device; and a signal generation unit configured to generate a signal including the control information as a signal for urging second joint communication jointly with the other wireless communication device. Thus, it is possible to obtain the operational effect of performing retransmission determination quickly and avoiding unnecessary retransmission by urging second joint communication and requesting communication result information.

According to the first aspect, the communication control unit may determine whether to perform retransmission in the second joint communication based on the communication result information. Thus, it is possible to obtain the operational effect of determining necessity or unnecessity of the retransmission based on the communication result information obtained after the signal for urging the second joint communication is generated.

According to the first aspect, the communication control unit may perform control such that retransmission in the second joint communication is cancelled when the communication result information indicates that reception of all data is successful. Thus, it is possible to obtain the operational effect of avoiding unnecessary retransmission based on the communication result information obtained after the signal for urging the second joint communication is generated.

According to the first aspect, when the communication result information indicates that the reception of some of the data is successful, the communication control unit specifies data indicating that reception of the communication result information has failed. The signal generation unit may generate the signal including identification information of the specified data. Thus, it is possible to obtain the operational effect of determining necessity or unnecessity of the retransmission for each piece of data.

According to the first aspect, the communication control unit may generate the signal including time information for requesting communication of the communication result information. The communication control unit may start the second joint communication when the communication result information is could not be acquired within a time indicated by the time information. Thus, it is possible to obtain the operational effect of avoiding unnecessary retransmission until the time indicated by the time information passes.

According to the first aspect, the communication control unit may generate second control information for requesting acquisition of the communication result information from the other wireless communication device. The signal generation unit may generate the signal further including the second control information. Thus, it is possible to obtain the operational effect of requesting the communication result information from the other wireless communication device when the second joint communication is urged.

According to the first aspect, the communication control unit may generate the second control information when the communication control unit determines that the communication result information is acquirable based on capability information of the other wireless communication device. Thus, it is possible to obtain the operational effect of requesting the communication result information from the other wireless communication device in accordance with the function of the other wireless communication device.

According to the first aspect, the signal generation unit may notify the other wireless communication device of information necessary for the other wireless communication device to acquire the communication result information. Thus, it is possible to obtain the operational effect of transmitting the communication result information when the other wireless communication device uses this information.

According to the first aspect, the communication result information may be transmitted from the other wireless communication device. Thus, it is possible to obtain the operational effect of sharing the communication result information between the wireless communication devices.

According to the first aspect, the communication result information may be transmitted from the transmission destination device. Thus, it is possible to obtain the operational effect of acquiring the communication result information from the transmission destination device even when a communication state between the wireless communication devices is unstable.

According to the first aspect, the control information may further include information for identifying a wireless communication device determining whether to perform retransmission in the new joint communication based on the communication result information. Thus, it is possible to obtain the operational effect of identifying the wireless communication device performing the retransmission determination.

A second aspect of the present technology is a wireless communication device including a communication control unit configured to generate control information for requesting another wireless communication device to retain communication result information regarding whether reception is successful in a transmission destination device when joint communication is performed jointly with the other wireless communication device; and a signal generation unit configured to generate a signal including the control information as a signal for urging the joint communication. Thus, it is possible to obtain the operational effect of urging the joint transmission and requesting the other wireless communication device to retain the communication result information regarding whether the reception is successful in the transmission destination device.

BRIEF DESCRIPTION OF DRAWINGS

FIG. 12 is a diagram illustrating examples of a block ACK sharing policy 792 and block ACK information 793 according to the embodiment of the present technology.

DESCRIPTION OF EMBODIMENTS

Hereinafter, modes for carrying out the present invention (hereinafter referred to as embodiments) will be described. The description will be made in the following order.

1. First Embodiment (example in which block ACK is shared with another access point)
2. Second Embodiment (example in which block ACK is retransmitted from wireless terminal)
3. Third Embodiment (example in which retransmission is determined in accordance with instruction from master access point)
4. Modification Examples 1. First Embodiment

[Wireless Communication System]

Figure 1:
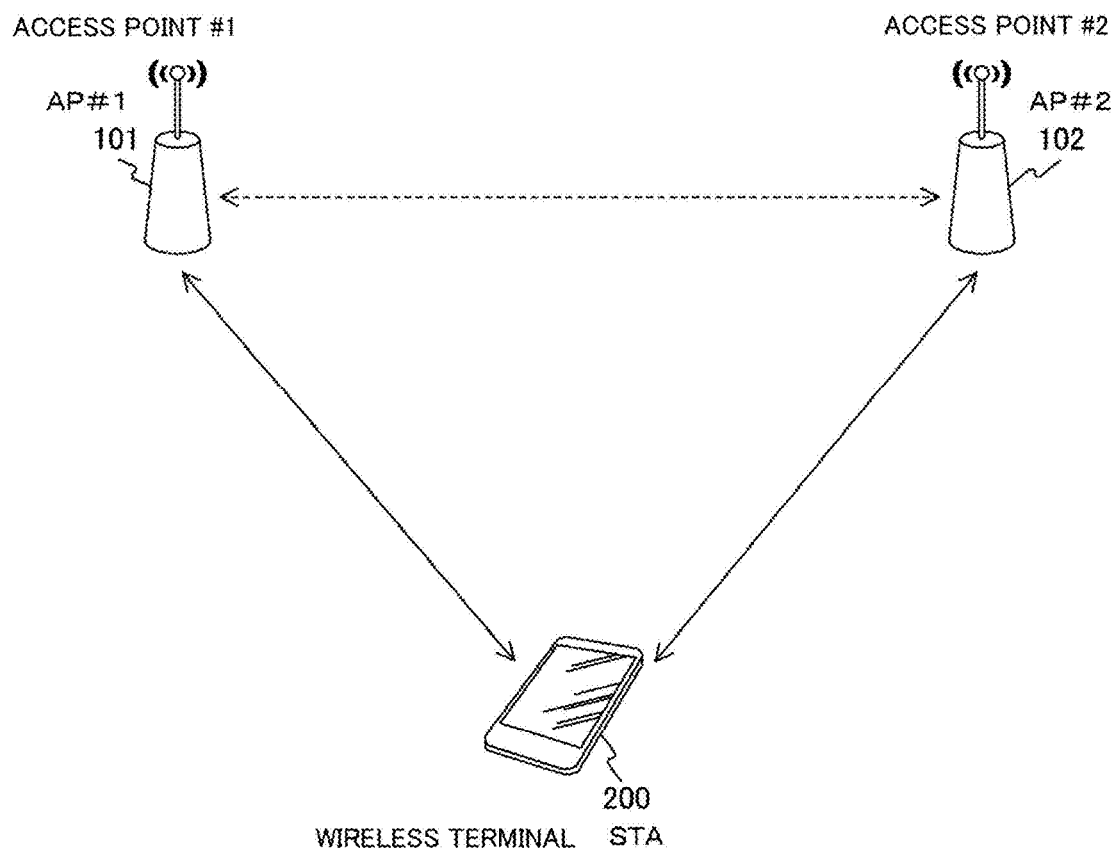
FIG. 1 is a diagram illustrating an example of an overall configuration of a wireless communication system according to an embodiment of the present technology.

FIG. 1 is a diagram illustrating an example of an overall configuration of a wireless communication system according to an embodiment of the present technology.

It is assumed that the wireless communication system includes a plurality of access points (APs: base stations) 101 (AP #1) and 102 (AP #2) and at least one wireless terminal 200 (STA). Here, it is assumed that the wireless terminal 200 is connected to the access point 101, and the access points 101 and 102 perform jointly communication in data communication from the access point 101 to the wireless terminal 200. The access points 101 and 102 may transmit the same signal to the wireless terminal 200 (beamforming) or may transmit different signals (MIMO). For joint communication, it is assumed that the access points 101 and 102 directly exchange control signals.

A system configuration of the target wireless communication system according to the embodiment of the present technology is not limited thereto. There may be a plurality of communication devices establishing connection and there may be communication devices as peripheral terminals of the communication devices. A positional relation does not matter as long as such conditions are satisfied.

[Wireless Communication Device]

Figure 2:
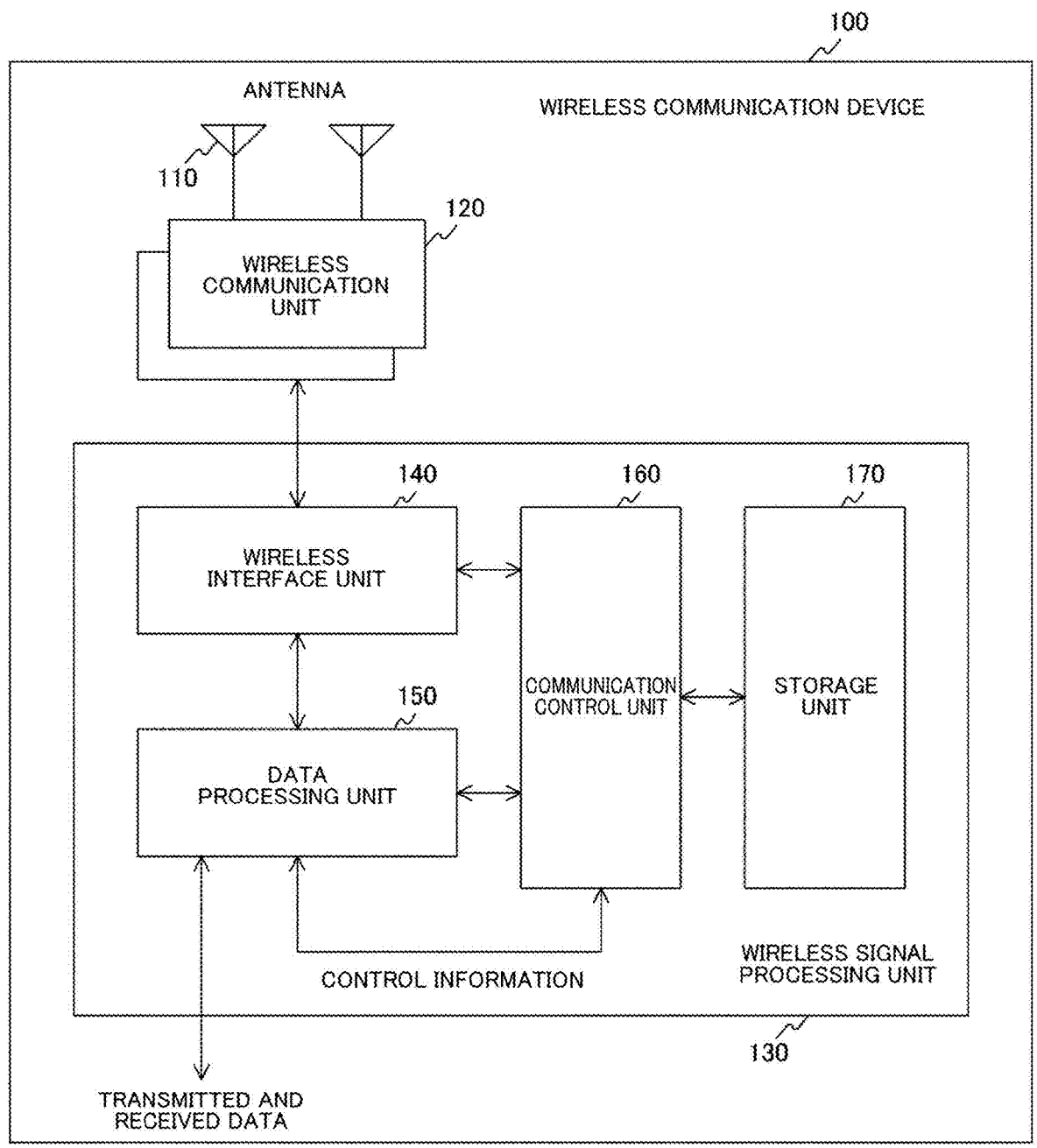
FIG. 2 is a diagram illustrating an exemplary configuration of a wireless communication device 100 according to an embodiment of the present technology.

FIG. 2 is a diagram illustrating an exemplary configuration of the wireless communication device 100 according to an embodiment of the present technology. As the wireless communication device 100, the above-described access points 101 and 102 are assumed. The wireless terminal 200 may have the same configuration.

The wireless communication device 100 includes an antenna 110, a wireless communication unit 120, and a wireless signal processing unit 130. The wireless communication unit 120 and the wireless signal processing unit 130 may be realized by different semiconductor chips.

The antenna 110 is an antenna that transmits and receives a wireless signal to and from another wireless communication device. The wireless communication unit 120 is a radio frequency (RF) circuit that transmits and receives a wireless signal to and from another wireless communication device.

The wireless communication unit 120 performs RF processing on a transmission signal generated by the wireless signal processing unit 130 to generate a wireless signal which is to be output from the antenna 110. The wireless communication unit 120 performs the RF processing on a wireless signal input to the antenna 110 to generate a received signal and delivers the received signal to the wireless signal processing unit 130. In this example, the pluralities of antennas 110 and wireless communication units 120 are illustrated assuming MIMO, but one antenna and one wireless communication unit may be provided in the embodiment.

The wireless signal processing unit 130 is a circuit that performs signal processing between a wireless signal and data. The wireless signal processing unit 130 includes a wireless interface unit 140, a data processing unit 150, a communication control unit 160, and a storage unit 170. The wireless signal processing unit 130 is not limited to this configuration and, for example, the wireless interface unit 140 may be configured as another semiconductor chip.

The storage unit 170 is a memory that stores and retains information necessary for communication control. In the embodiment, a block ACK signal transmitted to another wireless communication device is received in accordance with an instruction from the other wireless communication device. The storage unit 170 retains information regarding the acquired block ACK signal for a given time.

The communication control unit 160 controls overall operation of the communication device. The communication control unit 160 performs processing to deliver control information of which another wireless communication device is to be notified to the data processing unit 150. The communication control unit 160 performs retransmission determination to determine whether to retransmit data and to specify data in the retransmission. The communication control unit 160 generates the control information to be stored in a communication frame. The communication control unit 160 performs control necessary for joint communication.

The data processing unit 150 generates a transmission signal based on transmission data or the control information received from the communication control unit 160. The data processing unit 150 performs processing to demodulate the received signal received from the wireless communication unit 120 and extracts the received data or the control information. The data processing unit 150 generates a communication frame from the control information generated by the communication control unit 160. The data processing unit 150 is an example of a signal generation unit described in the claims.

The wireless interface unit 140 governs an interface with the wireless communication unit 120. The wireless interface unit 140 converts a transmission signal generated by the data processing unit 150 into an analog signal and outputs the analog signal to the wireless communication unit 120. The wireless interface unit 140 converts the received signal acquired from the wireless communication unit 120 into a digital signal.

[Joint Communication and Block ACK]

Hereinafter, a communication sequence in a case in which communication result information regarding whether reception is successful in the wireless terminal 200 is transmitted as a block ACK from the wireless terminal 200 to the access point 101 when the access points 101 and 102 jointly perform joint communication will be described. In the joint communication, the term "joint transmission" is used in some cases when transmission is particularly focused on. "Block ACK" is abbreviated to "BA" in some cases. The access point 101 is referred to as AP #1, the access point 102 is referred to as AP #2, and the wireless terminal 200 is referred to as STA in some cases.

Figure 3:
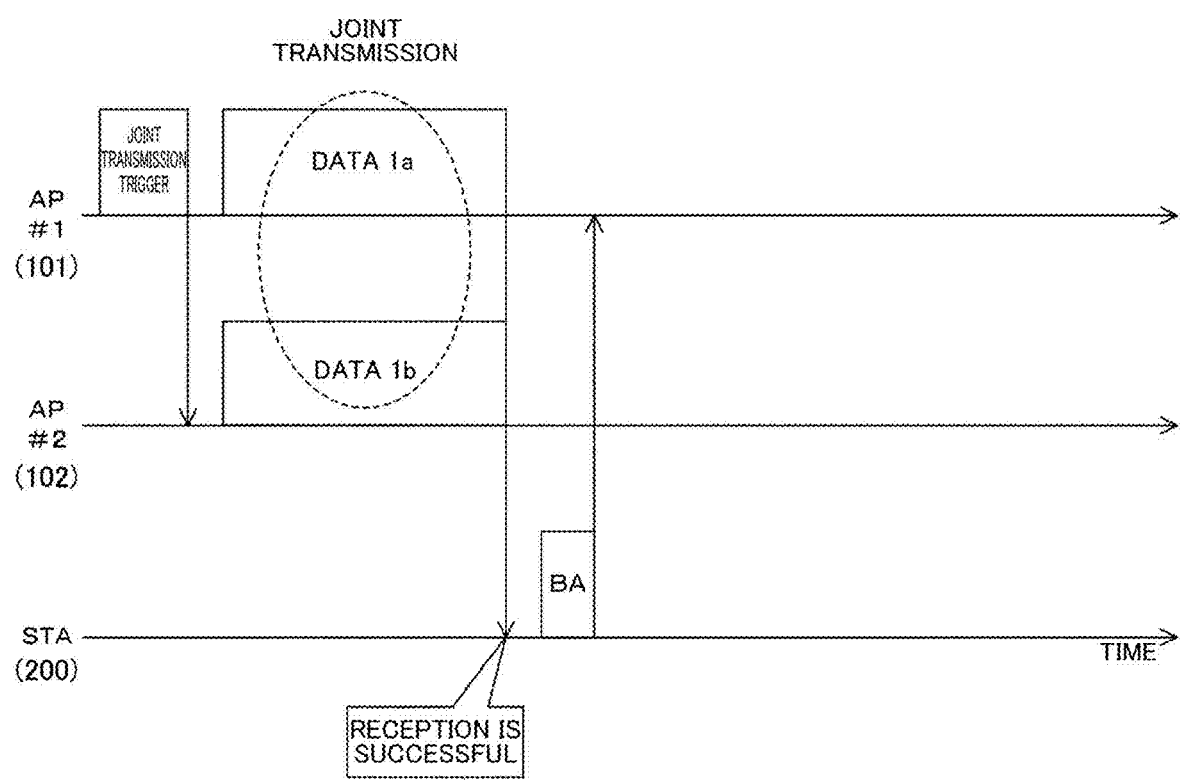
FIG. 3 is a diagram illustrating a normal transmission example by joint communication.

FIG. 3 is a diagram illustrating a normal transmission example by joint communication.

To start joint communication with the wireless terminal 200, one access point 101 transmits a joint transmission trigger frame to the other access point 102. The access point 102 arranges data to be transmitted or a transmission timing in accordance with control information in the received joint transmission trigger frame and performs joint communication with the access point 101. When the wireless terminal 200 successfully receives the data, the block ACK frame is transmitted. At this time, it is assumed that the wireless terminal 200 transmits the block ACK frame destined for the access point 101 which is a connection source.

In the embodiment, an example will be assumed in which a plurality of pieces of data are aggregated in the transmission signal, and thus the wireless terminal 200 notifies of communication success or failure information of each piece of data using the block ACK frame. This may be an example in which only one piece of data is in the transmission signal and the wireless terminal 200 transmits an ACK frame.

Figure 4:
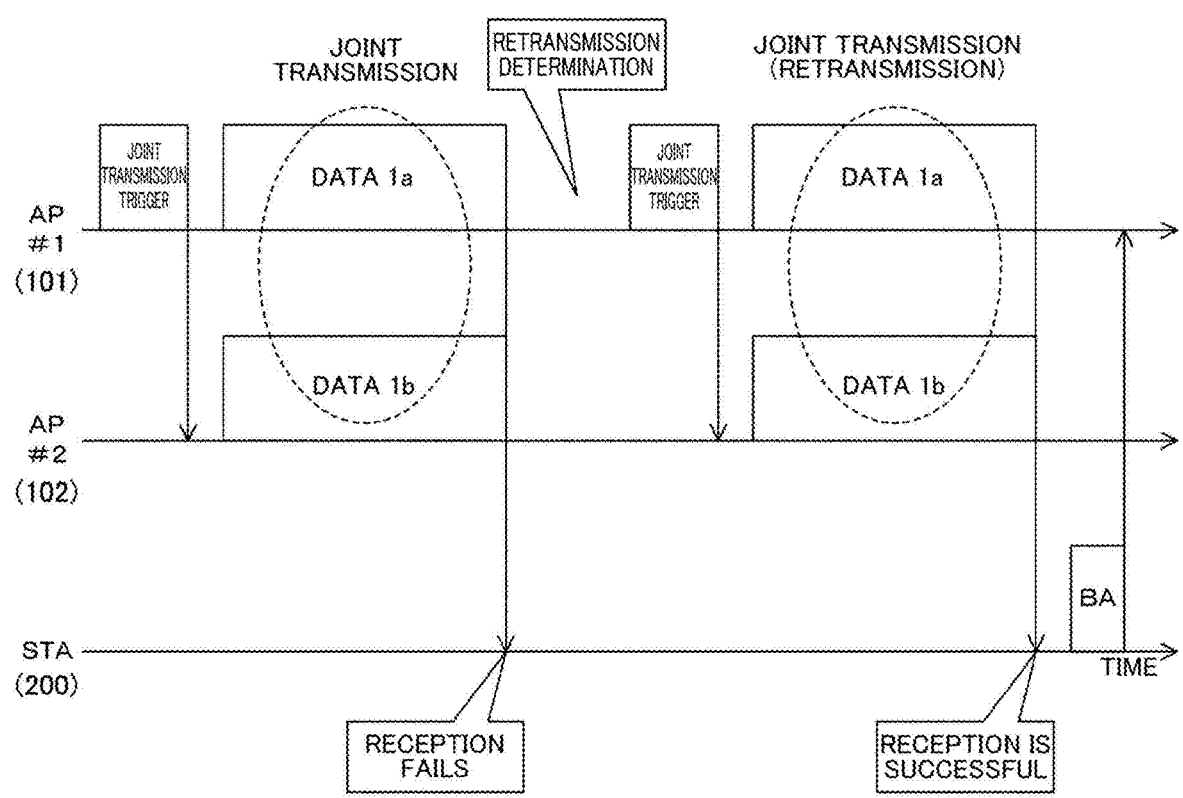
FIG. 4 is a diagram illustrating a retransmission example by the joint communication.

FIG. 4 is a diagram illustrating a retransmission example by the joint communication.

For example, when the wireless terminal 200 cannot receive one piece of data jointly transmitted by the access points 101 and 102, the processing ends without returning the frame to the access point 101. In this case, the access point 101 determines retransmission because no response frame can be received within a given time, and retransmits the joint transmission trigger frame to the access point 102 to perform joint communication for the same data.

Figure 5:
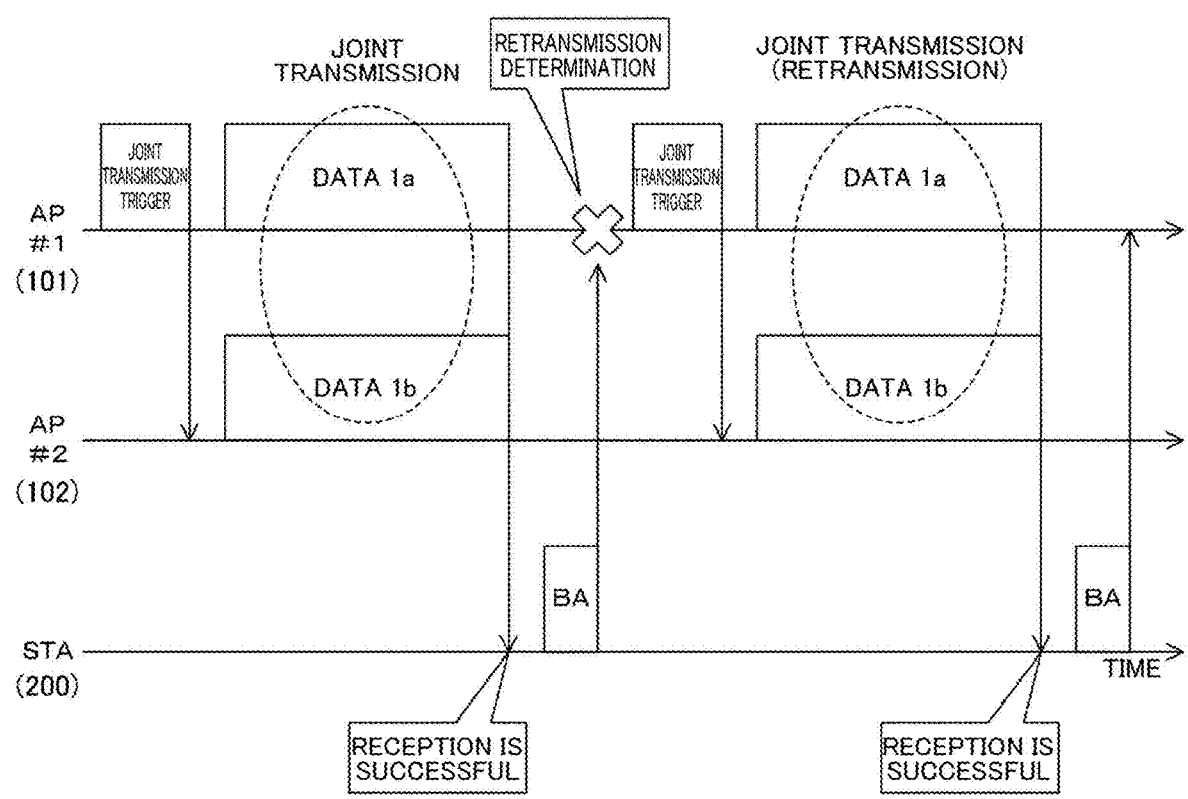
FIG. 5 is a diagram illustrating a first example in which retransmission is erroneously determined in the joint transmission.

FIG. 5 is a diagram illustrating a first example when retransmission is erroneously determined in the joint transmission.

Here, a case will be assumed in which the wireless terminal 200 successfully receives the joint communication data of the access points 101 and 102 and transmits the block ACK frame to the access point 101. At this time, a transmission power difference, channel situation worsening, or the like of the access point 101 and the wireless terminal 200 has an influence, and thus a situation in which the access point 101 has failed to receive the block ACK frame transmitted from the wireless terminal 200 can occur. In this case, the access point 101 determines that the wireless terminal 200 has not transmitted any response frame, and erroneously determines to retransmit all the data. Since the access points 101 and 102 retransmit the data that has already been acquired by the wireless terminal 200 due to the erroneous determination, as they are, communication efficiency considerably deteriorates.

Figure 6:
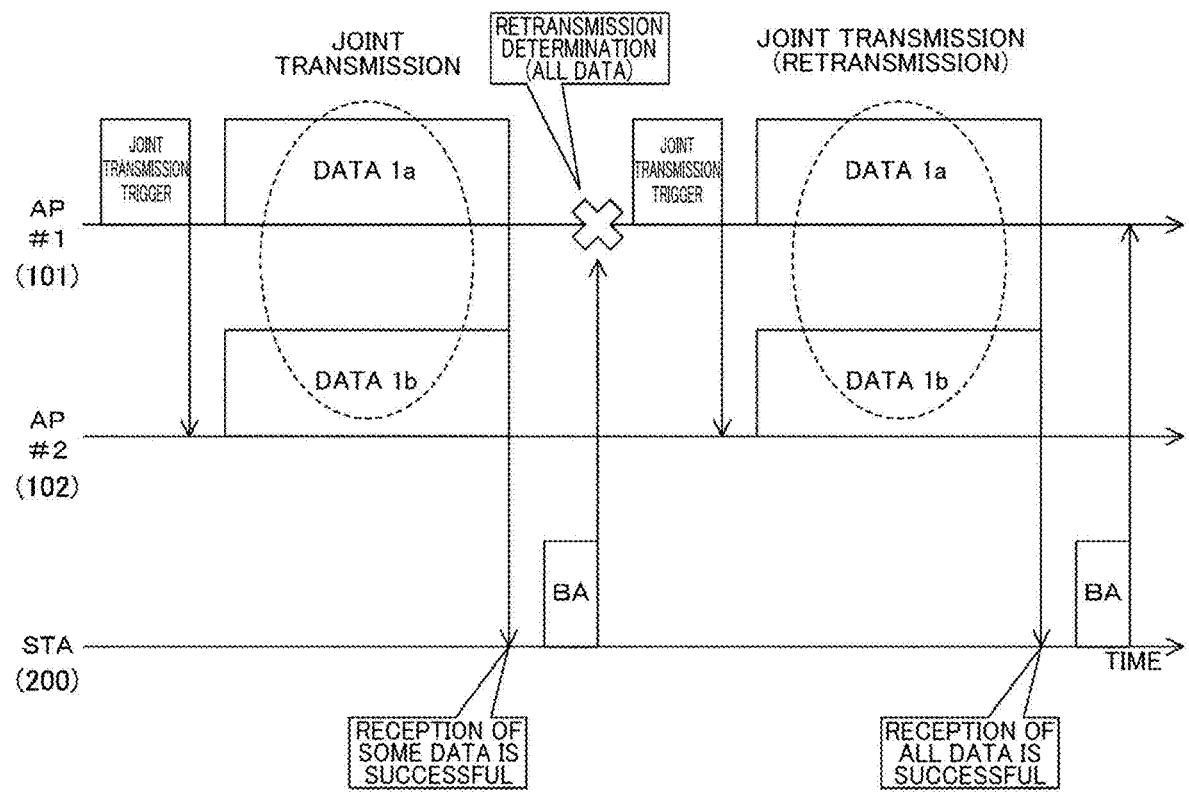
FIG. 6 is a diagram illustrating a second example in which retransmission is erroneously determined in the joint transmission.

FIG. 6 is a diagram illustrating a second example when retransmission is erroneously determined in the joint transmission.

Here, it is assumed that the wireless terminal 200 successfully receives some of the data and an identifier of successful or failed data is notified of with the block ACK frame. Even in this case, when the access point 101 has failed to receive the block ACK frame transmitted from the wireless terminal 200, the access point 101 erroneously determines to retransmit all the data. Since the access points 101 and 102 retransmit the data that has already been acquired by the wireless terminal 200 due to the erroneous determination, as they are, communication efficiency considerably deteriorates.

For these two examples, preventing unnecessary data retransmission by allowing the access point 101 to transmit a request signal for acquiring the block ACK frame again from the wireless terminal 200 can be considered. However, in this case, when the wireless terminal 200 really has failed to receive all the data, a request signal is transmitted, and thus communication efficiency is worsened to the extent that the block ACK frame is awaited. Further, when a channel situation between the access point 101 and the wireless terminal 200 has worsened, the request signal has to be transmitted until recovery of the channel situation. Thus, there is concern of the communication situation really being worse and the communication efficiency being worsened when data reception has failed.

Accordingly, in the following embodiment, a scheme of avoiding unnecessary retransmission or transmission of a request signal by sharing information regarding a block ACK acquired from the wireless terminal 200 between the access points 101 and 102 on the premise of joint communication will be described. Specifically, transmission time information or information regarding a block ACK to be shared is included in a joint transmission trigger frame for urging the joint communication. Thus, only when the access point 101 transmitting the joint transmission trigger frame erroneously determines retransmission, information regarding the block ACK is shared between the access points 101 and 102, and thus unnecessary retransmission can be eliminated. When the retransmission is correctly determined, the joint communication of the retransmission data can be started by the access points 101 and 102 without change. Therefore, it is possible to avoid unnecessary frame exchange in which the retransmitted request signal is transmitted.

[Overall Sequence]

Figure 7:
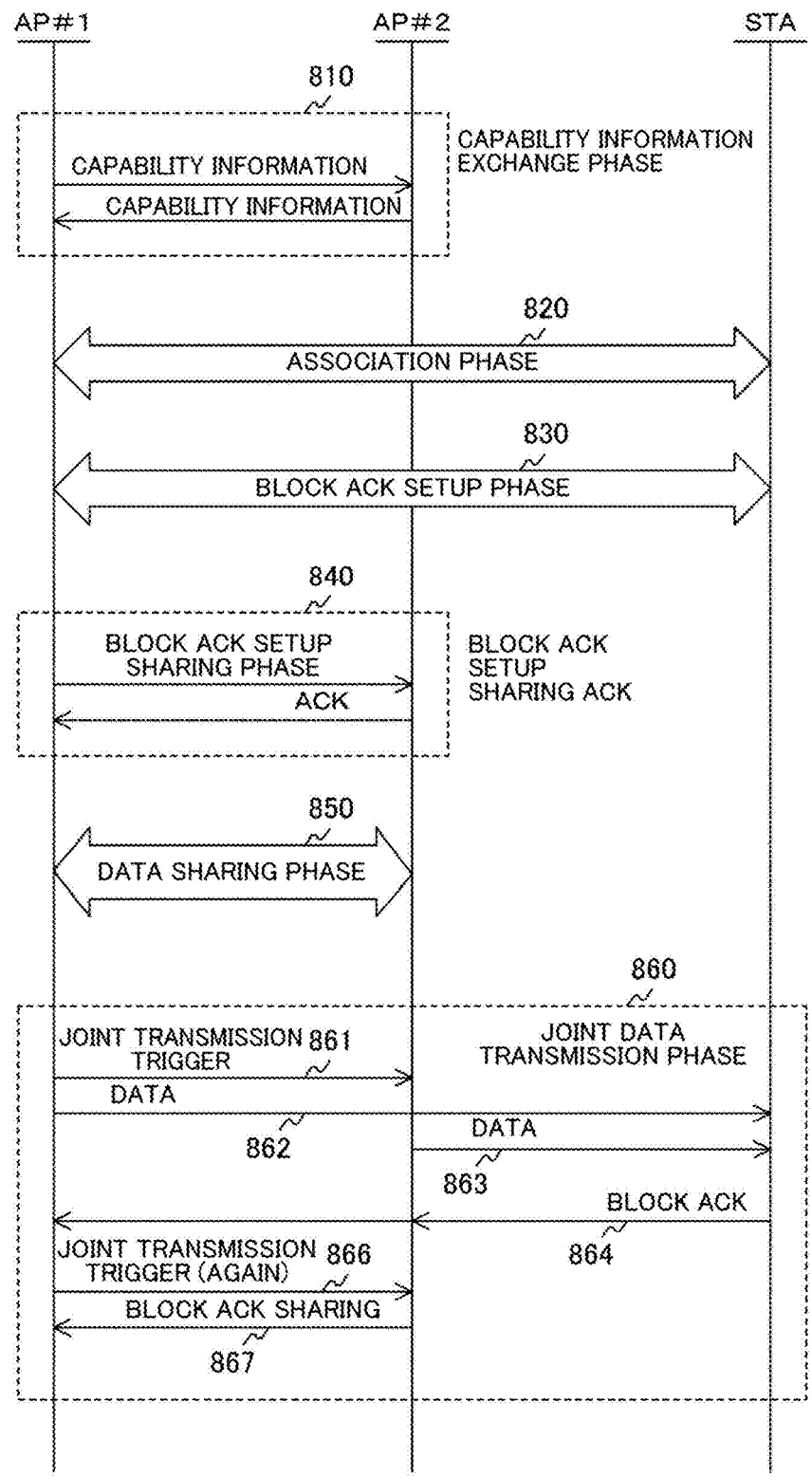
FIG. 7 is a diagram illustrating an example of an overall sequence of processing in a wireless communication system according to a first embodiment of the present technology.

FIG. 7 is a diagram illustrating an example of an overall sequence of processing in a wireless communication system according to a first embodiment of the present technology.

Here, six phases, a capability information exchange phase 810, an association phase 820, a block ACK setup phase 830, a block ACK setup sharing phase 840, a data sharing phase 850, and a joint data transmission phase 860, are assumed. The order of the phases may not be this order. For example, the capability information exchange phase 810 may be performed after the association phase 820. Each phase may not necessarily be separated. For example, the block ACK setup sharing phase 840 may be performed simultaneously with the data sharing phase 850.

The capability information exchange phase 810 is a phase in which capability information is exchanged between the access points 101 and 102 performing joint communication. The capability information is information regarding a function or capability of the access points 101 and 102. In the embodiment, it is assumed that the access point 102 notifies the access point 101 of information indicating whether to retain and share information regarding the block ACK destined for another access point.

The association phase 820 is a phase in which connection processing between the access point 101 and the wireless terminal 200 is completed.

The block ACK setup phase 830 is a phase in which information regarding the block ACK exchanged between the access point 101 and the wireless terminal 200 is exchanged and prepared for. For example, information regarding an available buffer size is exchanged, and thus the number of pieces of data which can be notified of at a time with the block ACK can be determined.

The block ACK setup phase 830 may be performed periodically as well as immediately after the association phase 820.

The block ACK setup sharing phase 840 is a phase in which the access point 102 performing the joint communication is notified of information regarding the block ACK determined in the block ACK setup phase 830. In the block ACK setup sharing phase 840, the access point 102 can receive and retain the block ACK frame from the wireless terminal 200.

The block ACK setup sharing phase 840 may not be performed immediately after the block ACK setup phase 830. For example, when there are the plurality of wireless terminals 200, as soon as the block ACK setup phase 830 is completed among the plurality of wireless terminals 200, information regarding all the wireless terminals 200 may be summarized and notified of in the one-time block ACK setup sharing phase 840.

The data sharing phase 850 is a phase in which a jointly communicated data signal is shared between the access points 101 and 102. For example, the access points 101 and 102 may retain the same data, but the present technology is not limited thereto. In the case of joint communication in which it is not necessary to share data, the data sharing phase 850 may be omitted.

The joint data transmission phase 860 is a phase in which the access points 101 and 102 perform joint communication on the wireless terminal 200. The access point 101 transmits a joint transmission trigger frame to the access point 102 (861). Thus, the access points 101 and 102 jointly transmit data to the wireless terminal 200 (862 and 863). Thereafter, the wireless terminal 200 transmits a block ACK frame to check whether reception of the data is successful (864).

When the block ACK frame is not received from the wireless terminal 200 within a predetermined time, the access point 101 transmits a retransmission joint transmission trigger frame to the access point 102 (866). Then, the access point 102 transmits information regarding the block ACK frame received from the wireless terminal 200 by itself as a block ACK sharing frame to the access point 101 (867).

[Frame Structure]

Figure 8:
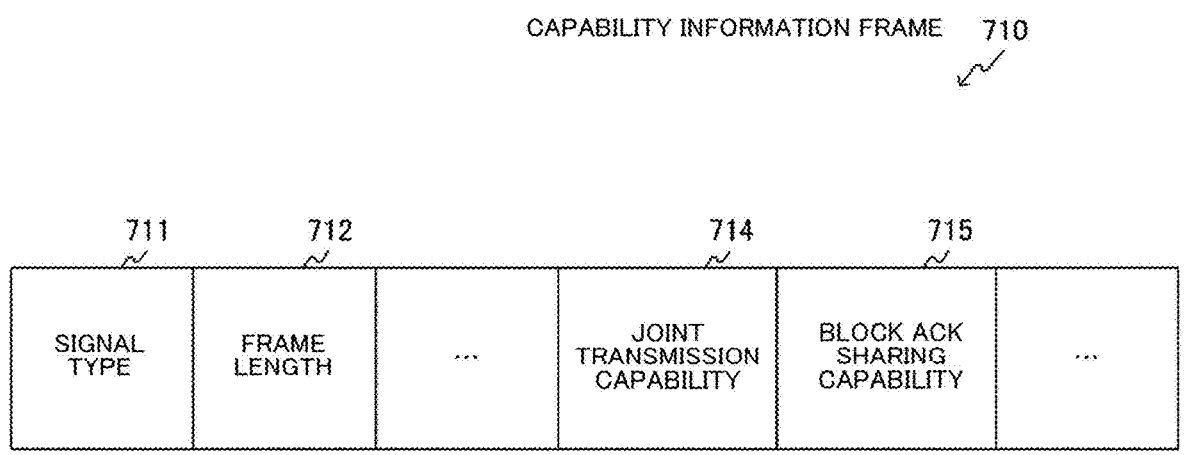
FIG. 8 is a diagram illustrating a field structure example of a capability information frame 710 in a capability information exchange phase 810 according the embodiment of the present technology.

FIG. 8 is a diagram illustrating a field structure example of a capability information frame 710 in a capability information exchange phase 810 according the embodiment of the present technology.

The capability information frame 710 includes a signal type 711, a frame length 712, a joint transmission capability 714, and a block ACK sharing capability 715.

The signal type 711 includes information indicating that this frame is a frame including capability information exchanged between the access points. The frame length 712 includes information regarding a length of the frame.

The joint transmission capability 714 includes information regarding whether the joint transmission is performed and a transmission method. The information regarding the transmission method, for example, a type indicating whether the information is coherent or non-coherent, or the like is assumed.

The block ACK sharing capability 715 includes information regarding whether the block ACK frame transmitted to another access point is received and the information can be retained, and information regarding a retention capability or a time for which it can be retained. As the information regarding the retention capability, for example, a buffer size or the like is assumed.

Figure 9:
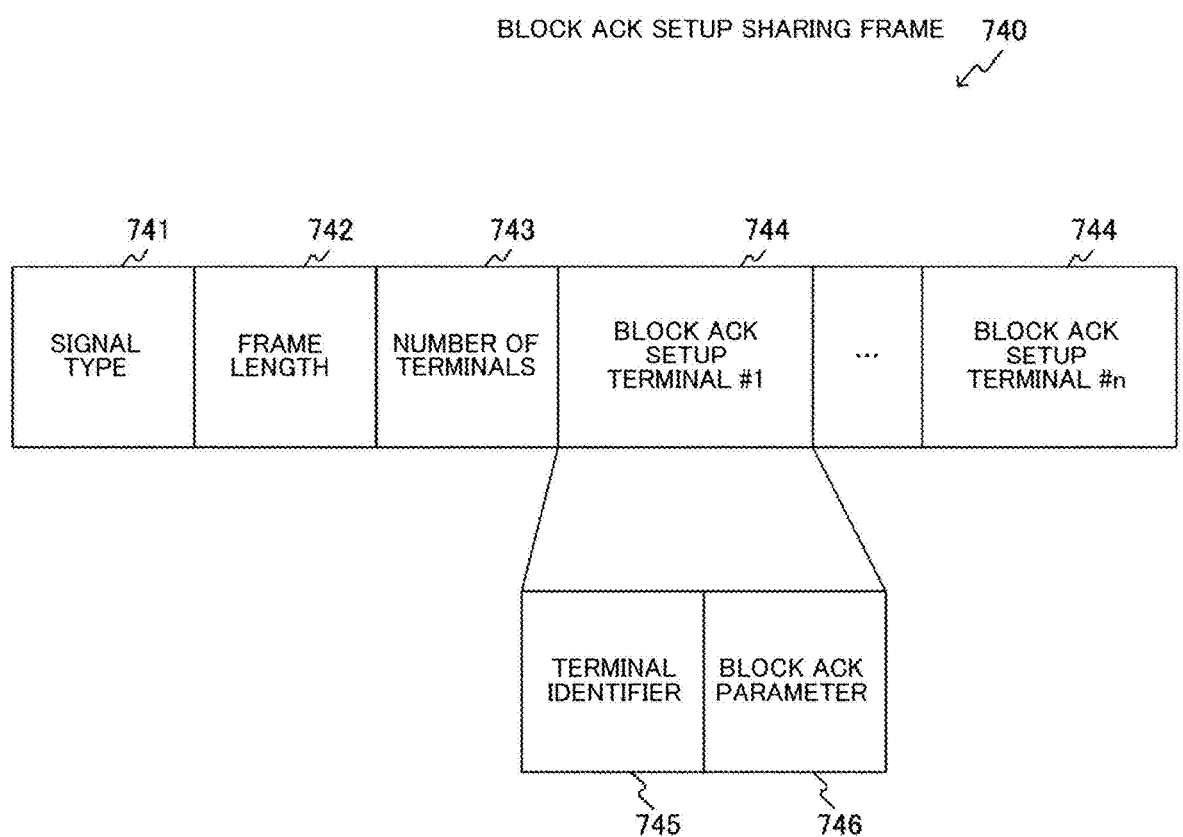
FIG. 9 is a diagram illustrating a field structure example of a block ACK setup sharing frame 740 in a block ACK setup sharing phase 840 according to the embodiment of the present technology.

FIG. 9 is a diagram illustrating a field structure example of the block ACK setup sharing frame 740 in the block ACK setup sharing phase 840 according to the embodiment of the present technology.

The block ACK setup sharing frame 740 includes a signal type 741, a frame length 742, the number of terminals 743, and a black ACK setup 744 for each terminal.

The signal type 741 includes information indicating that this frame is a frame including a block ACK parameter of each wireless terminal 200 exchanged between the access points. The frame length 742 includes information regarding a length of the frame.

The number of terminals 743 includes information indicating the number of wireless terminals 200 which are notified of the block ACK parameter.

The block ACK setup 744 includes a terminal identifier 745 and a block ACK parameter 746 for each wireless terminal 200. The terminal identifier 745 is an identifier for identifying each wireless terminal 200. The block ACK parameter 746 includes, for example, information indicating whether a type of ACK is an immediate ACK or a delayed ACK or information regarding a buffer size.

Figure 10:
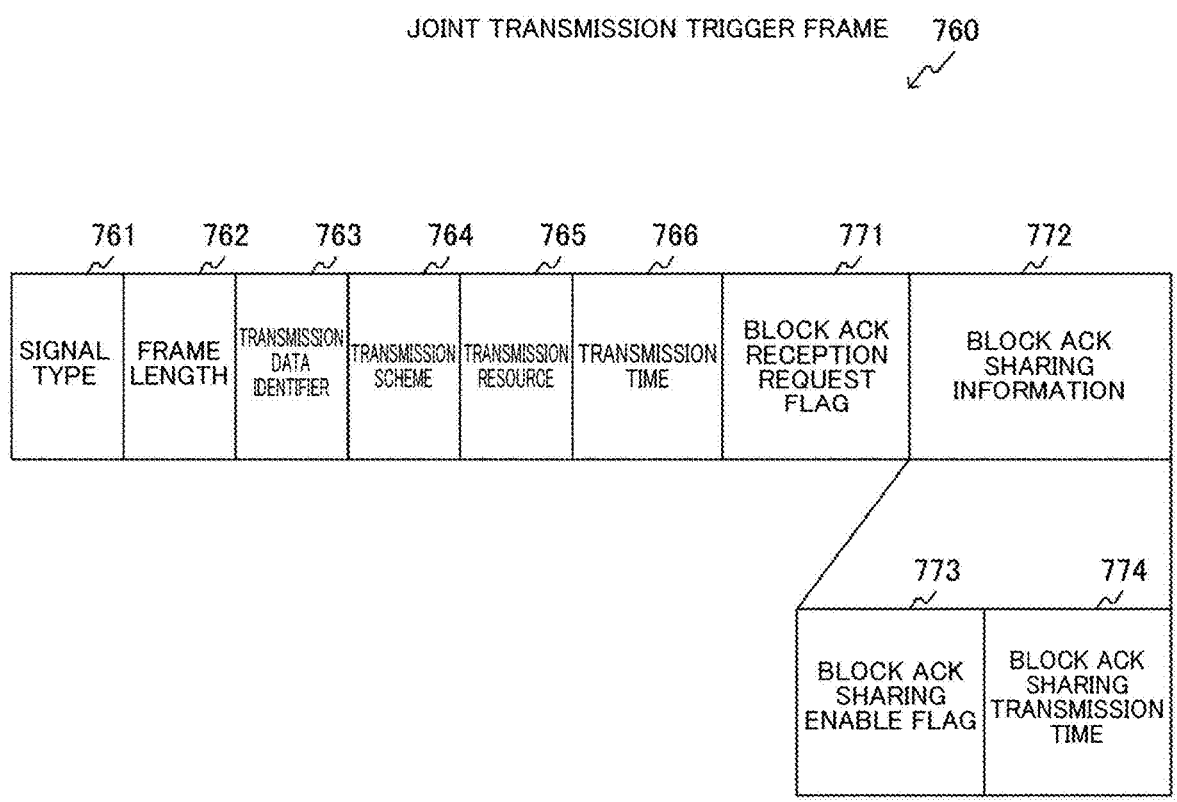
FIG. 10 is a diagram illustrating a field structure example of a joint transmission trigger frame 760 in a joint data transmission phase 860 according to the first embodiment of the present technology.

FIG. 10 is a diagram illustrating a field structure example of a joint transmission trigger frame 760 in the joint data transmission phase 860 according to the first embodiment of the present technology.

The joint transmission trigger frame 760 includes a signal type 761, a frame length 762, a transmission data identifier 763, a transmission scheme 764, a transmission resource 765, a transmission time 766, a block ACK reception request flag 771, and a block ACK sharing information 772.

The signal type 761 includes information indicating that this frame is a frame related to a transmission request. The frame length 762 includes information regarding a length of the frame.

The transmission data identifier (Transmit Data ID) 763 includes information for identifying target data of the transmission request. In the joint transmission trigger frame 760 at the time of retransmission, the transmission data identifier 763 which is the same as the previously transmitted data is designated.

The transmission scheme (Transmit Scheme) 764 includes information regarding a communication scheme used to transmit data which is a target of the transmission request.

The transmission resource (Transmit Resource) 765 includes information regarding a communication resource used to transmit the data which is a target of the transmission request.

The transmission time (Transmit Time) 766 includes information regarding a transmission start time of the data which is a target of the transmission request.

The block ACK reception request flag (Block ACK Receiving Flag) 771 includes information indicating whether to make a request for retaining information acquired by receiving the block ACK frame from the wireless terminal 200 for a given time. Here, the given time may be the time for which retention is possible described in the block ACK sharing capability 715 of the capability information of the access point or may be a time until subsequent joint communication ends. When the block ACK sharing capability 715 of the capability information of the access point indicates that the block ACK frame information can be retained, the retention can be requested with the block ACK reception request flag 771.

The block ACK sharing information 772 includes a block ACK sharing enable flag 773 and a block ACK sharing transmission time 774. The block ACK sharing enable flag 773 is information indicating whether the access point 102 receiving the joint transmission trigger frame 760 may transmit a block ACK sharing frame to be described below to the access point 101. The block ACK sharing transmission time (BA Sharing Transmit Time) 774 is information regarding a transmission time when the block ACK sharing frame is transmitted. A transmission start time of the block ACK sharing frame designated at the block ACK sharing transmission time 774 has to be a time earlier than a data transmission start time designated in the transmission time 766.

The block ACK reception request flag 771 may not be included in the joint transmission trigger frame 760 but may be included in, for example, an initiation frame for designating start of a series of joint communication. The initiation frame can be transmitted before the data sharing phase 850. On the other hand, content of the initiation frame may be included in the joint transmission trigger frame 760.

The block ACK reception request flag 771 and the block ACK sharing information 772 may be uniquely determined in a standard or the like and may not necessarily be included in the frame. For example, when the block ACK sharing transmission time 774 is determined invariably as a short inter frame space (SIFS), the block ACK sharing transmission time 774 may not be notified of with the joint transmission trigger frame 760.

Figure 11:
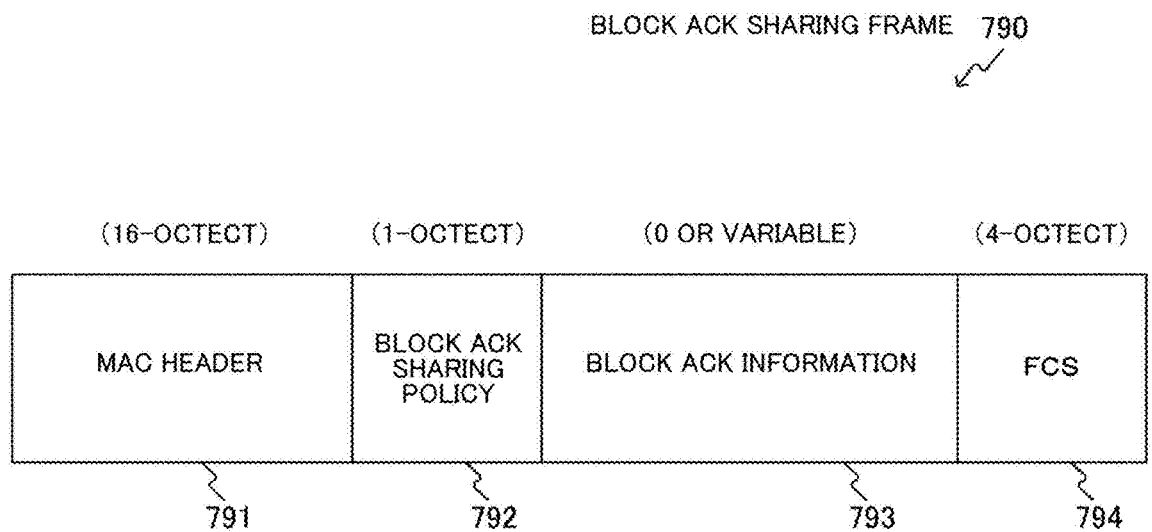
FIG. 11 is a diagram illustrating a field structure example of a block ACK sharing frame 790 in the joint data transmission phase 860 according to the embodiment of the present technology.

FIG. 11 is a diagram illustrating a field structure example of a block ACK sharing frame 790 in the joint data transmission phase 860 according to the embodiment of the present technology.

Here, as the block ACK sharing frame 790, an action frame defined in IEEE802.11 is assumed. The block ACK sharing frame 790 includes a MAC header 791, a block ACK sharing policy 792, block ACK information 793, and an FCS 794.

The MAC header 791 is a 16-octet header of a media access control (MAC) frame and includes an identifier indicating that this frame is the block ACK sharing frame 790 or an identifier indicating a transmission destination or a transmission source.

The block ACK sharing policy 792 is 1-octet information indicating a format of the block ACK information to be shared and indicates a data reception success situation or a type of the block ACK frame received from the wireless terminal 200. The block ACK information 793 is block ACK information acquired from the wireless terminal 200. Content of the block ACK sharing policy 792 and the block ACK information 793 will be described below.

The frame check sequence (FCS) 794 is 4-octet error correction information in the block ACK sharing frame 790.

FIG. 12 is a diagram illustrating examples of a block ACK sharing policy 792 and block ACK information 793 according to the embodiment of the present technology.

The block ACK sharing policy 792 which is "001" means that a single ACK is received from the wireless terminal 200. The block ACK sharing policy 792 which is "010" means that a block ACK is received from the wireless terminal 200, and the block ACK indicates that reception of all the data is successful. The block ACK sharing policy 792 which is "000" means that nothing is received from the wireless terminal 200.

The block ACK sharing policy 792 which is "011" means that a block ACK is received from the wireless terminal 200, and the block ACK indicates that reception of only some of the data is successful. In this case, the block ACK information 793 indicates information regarding whether reception corresponding to the transmission data identifier is successful.

The format of the block ACK information 793 may be the same as a block ACK variant (BA variant) standardized in IEEE 802.11-2016, that is, a start sequence number and a bitmap. The content of the present standard may not be included and information corresponding to each transmission data identifier and whether the reception is successful may be included.

[Operation]

Figure 13:
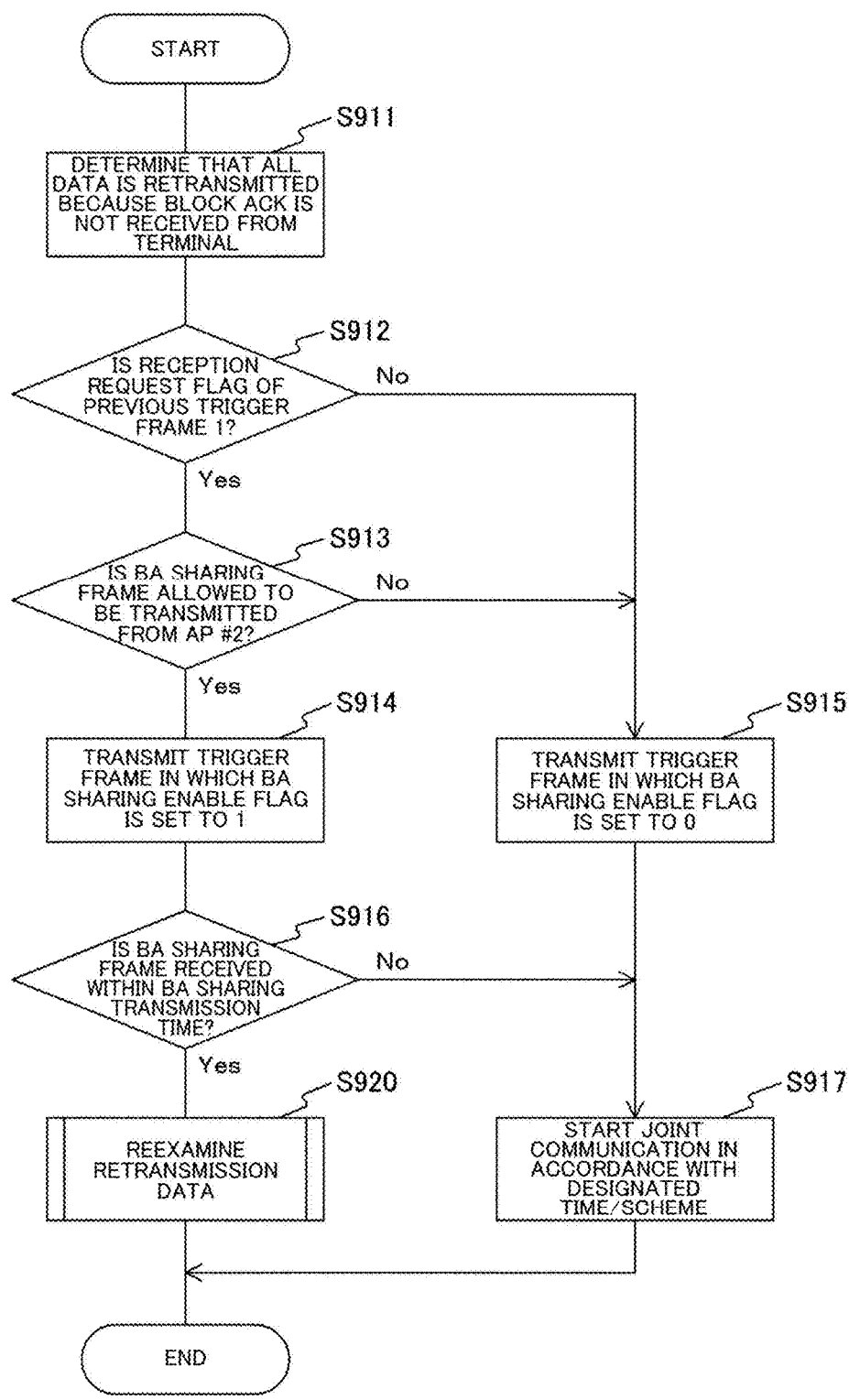
FIG. 13 is a flowchart illustrating a processing procedure example of retransmission determination processing in an access point 101 according to the first embodiment of the present technology.

FIG. 13 is a flowchart illustrating a processing procedure example of retransmission determination processing in the access point 101 according to the first embodiment of the present technology.

The access point 101 performs the following processing when the block ACK frame is not received from the wireless terminal 200 and all the data is determined to be retransmitted (step S911). That is, when the block ACK reception request flag 771 in the immediately transmitted joint transmission trigger frame 760 is "1" (Yes in step S912) and the access point 102 is allowed to transmit the block ACK sharing frame 790 (Yes in step S913), the new joint transmission trigger frame 760 in which the block ACK sharing enable flag 773 is set to "1" is transmitted to the access point 102 (step S914).

Thereafter, when the block ACK sharing frame 790 can be received from the access point 102 within the block ACK sharing transmission time 774 designated in the new joint transmission trigger frame 760 (Yes in step S916), the retransmission data is reexamined based on the information (step S920).

Conversely, when the block ACK sharing frame 790 cannot be received from the access point 102 within the block ACK sharing transmission time 774 designated in the new joint transmission trigger frame 760 (No in step S916), the access point 101 determines that the retransmission determination is correct and starts the joint communication in accordance with the transmission scheme 764 and the transmission time 766 designated in the joint transmission trigger frame 760 (step S917).

When the block ACK reception request flag 771 in the immediately previously transmitted joint transmission trigger frame 760 is "0" (No in step S912) or the block ACK sharing frame 790 is not allowed to be acquired from the access point 102 (No in step S913), the new joint transmission trigger frame 760 in which the block ACK sharing enable flag 773 is set to "0" is transmitted to the access point 102 (step S915). Then, the joint communication is started in accordance with the transmission scheme 764 and the transmission time 766 designated in the joint transmission trigger frame 760 (step S917).

When the joint transmission trigger frame 760 is transmitted to the access point 102, the access point 101 may receive the ACK signal from the access point 102 to check that the transmission is correctly performed. In this case, when the joint transmission trigger frame 760 is transmitted to the access point 102 and then the ACK is received from the access point 102, the access point 101 starts the joint communication in accordance with the designated transmission scheme 764 and transmission time 766. Then, when the block ACK sharing frame 790 is received, the access point 101 reexamines the retransmission data. At this time, when the ACK or the block ACK sharing fame 790 cannot be received within the given time, the same joint transmission trigger frame 760 may be transmitted again. In this case, it may be awaited slightly until the transmission starts. Whether the ACK is received may be determined in conformity with a standard or may be requested with information in the joint transmission trigger frame 760. Whether the ACK is received may be determined to be exchanged between the access points in advance.

Figure 14:
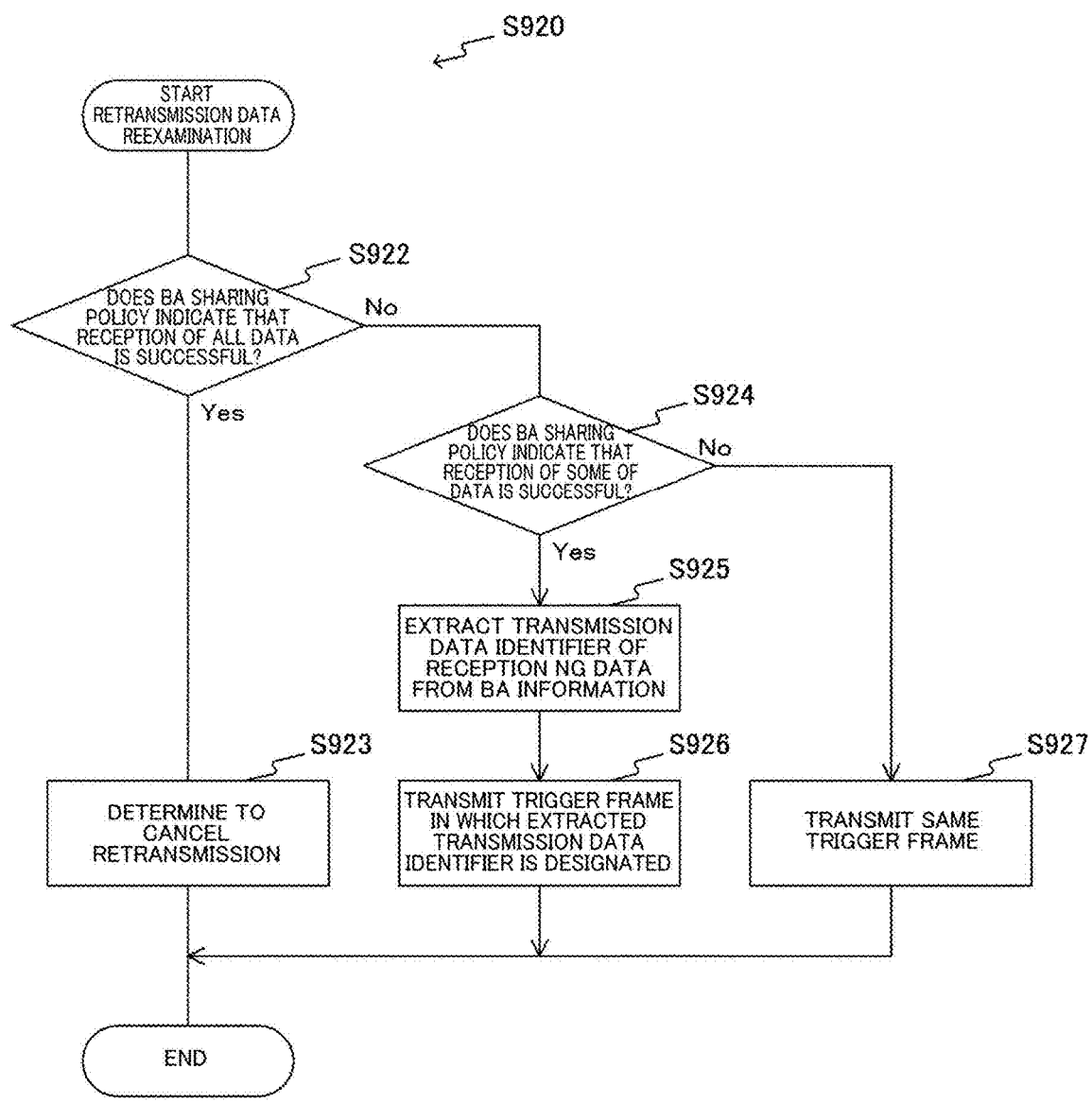
FIG. 14 is a flowchart illustrating a processing procedure example of retransmission reexamination processing (step S920) in the access point 101 according to the embodiment of the present technology.

FIG. 14 is a flowchart illustrating a processing procedure example of retransmission reexamination processing (step S920) in the access point 101 according to the embodiment of the present technology.

When the block ACK sharing policy 792 indicates that the reception of all the data is successful (Yes in step S922), the access point 101 receiving the block ACK sharing frame 790 knows that the reception of all the data in the wireless terminal 200 is successful and cancels the retransmission (step S923).

Conversely, when the block ACK sharing policy 792 indicates that the reception of only some of the data is successful (Yes in step S924), the transmission data identifier in which the reception has failed is extracted based on the block ACK information 793 (step S925) and the joint transmission trigger frame 760 for giving an instruction for the joint communication with only the transmission data identifier is transmitted (step S926).

When the block ACK sharing policy 792 is in the other cases, it means that the reception of all the data has failed. In these cases, the same joint transmission trigger frame 760 is transmitted again (step S927).

Figure 15:
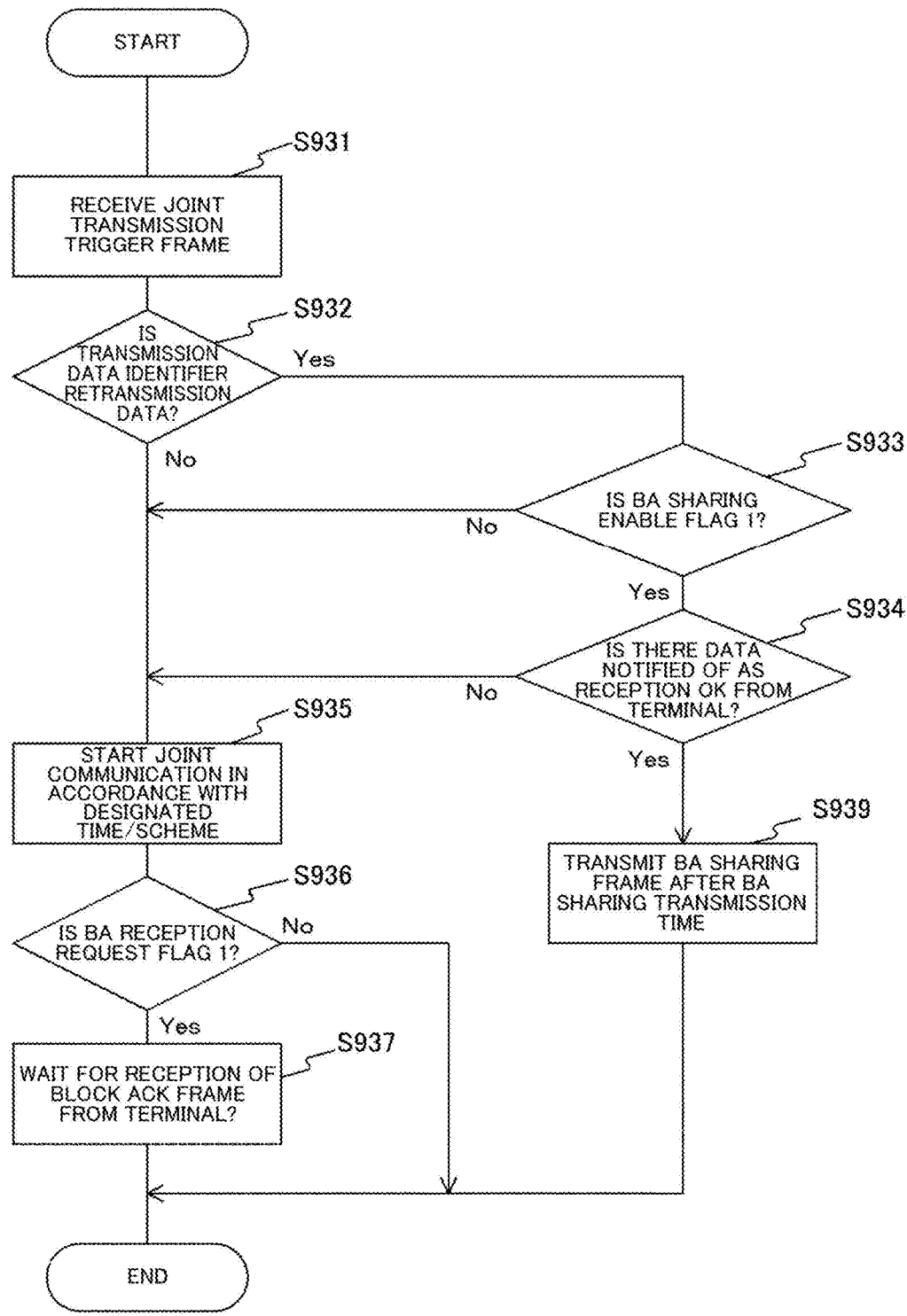
FIG. 15 is a flowchart illustrating a processing procedure example of reception processing of a joint transmission trigger frame 760 in an access point 102 according to the embodiment of the present technology.

FIG. 15 is a flowchart illustrating a processing procedure example of reception processing of a joint transmission trigger frame 760 in an access point 102 according to the embodiment of the present technology.

When the joint transmission trigger frame 760 is received (step S931), the access point 102 determines whether the data on which the joint communication designated with the transmission data identifier 763 is performed is is the retransmission data (step S932). When the data is not the retransmission data (No in step S932), the joint communication is started in accordance with the transmission scheme 764 and the transmission time 766 designated in the joint transmission trigger frame 760 (step S935). At this time, when the block ACK reception request flag 771 in the joint transmission trigger frame 760 is "1" (Yes in step S936), the access point 102 waits for reception of the block ACK frame transmitted from the wireless terminal 200 and stores information in the storage unit 170 and retains the information for a given time after the reception of the block ACK frame (step S937).

Conversely, when retransmission data is designated with the data on which the joint communication is performed (Yes in step S932) and when the block ACK sharing enable flag 773 in the joint transmission trigger frame 760 is "1" (Yes in step S933) and the data notified of as the data successfully received from the wireless terminal 200 is included in the transmission data identifier 763 (Yes in step S934), the access point 102 transmits the block ACK sharing frame 790 to the access point 101 after the block ACK sharing transmission time 774 (step S939).

Here, a threshold with which the block ACK sharing frame 790 is determined to be transmitted is not particularly limited. For example, when even one piece of data notified of as the successfully received data is included, the block ACK sharing frame 790 may be transmitted. When a given number of pieces of data or more notified of as the successfully received data is included, the block ACK sharing frame 790 may be transmitted.

The access point 102 transmits the ACK signal before step S935 when the ACK signal is requested from the access point 101 after the transmission of the joint transmission trigger frame 760.

Figure 16:
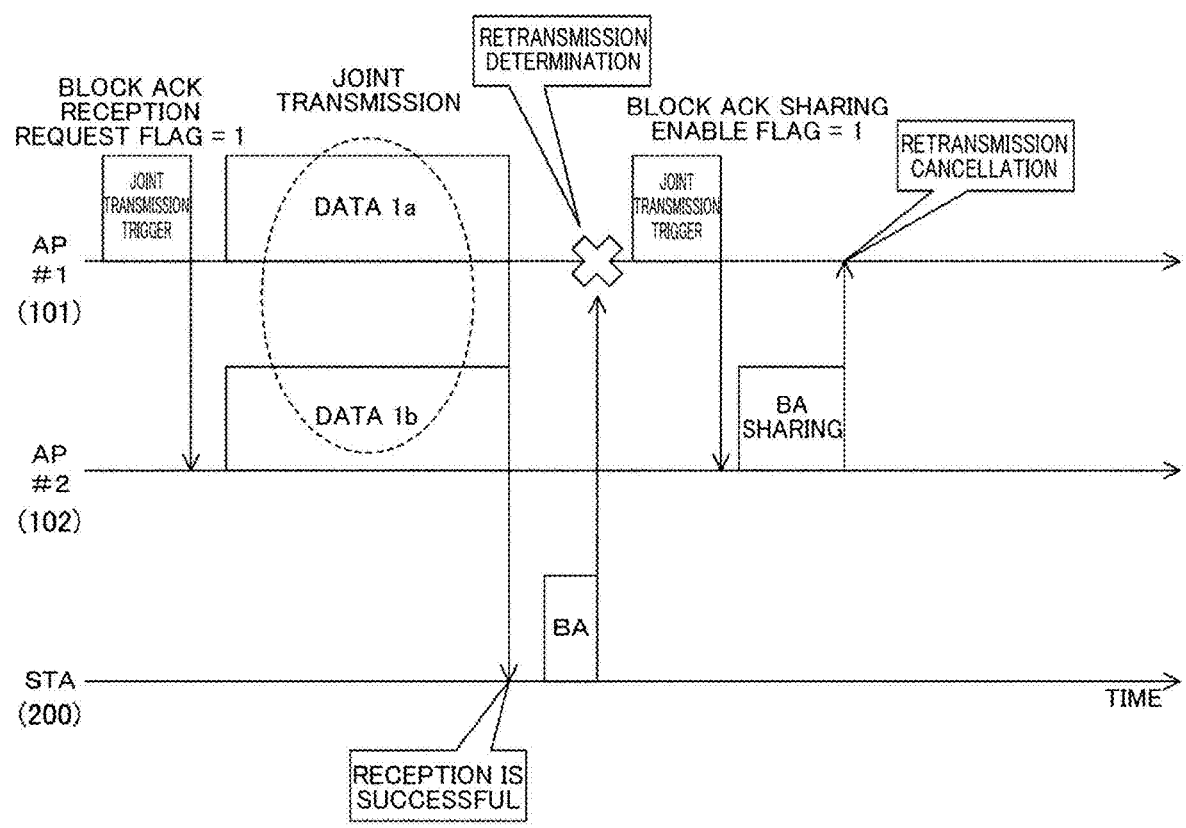
FIG. 16 is a diagram illustrating an operation example in which the access point 101 determines to cancel retransmission according to the first embodiment of the present technology.

FIG. 16 is a diagram illustrating an operation example when the access point 101 determines to cancel retransmission according to the first embodiment of the present technology.

In first joint communication, the access point 101 transmits the joint transmission trigger frame 760 in which the block ACK reception request flag 771 is "1" to the access point 102. Thus, an instruction can be given to the access point 102 so that the block ACK frame is received and retained from the wireless terminal 200.

Thereafter, the access point 101 that has failed to receive the block ACK frame transmits the retransmission joint transmission trigger frame 760 in which the block ACK sharing enable flag 773 is set to "1" to the access point 102. Thus, the access point 102 compares data information instructed to be retransmitted by the access point 101 with the block ACK information acquired from the wireless terminal 200 and transmits the block ACK sharing frame 790 including the received block ACK information to the access point 101. Thereafter, based on the information in the block ACK sharing frame 790, the access point 101 knows that the wireless terminal 200 successfully receive all the data and cancels the retransmission. In this way, by sharing the block ACK information between the access points, it is possible to prevent the unnecessary retransmission.

Figure 17:
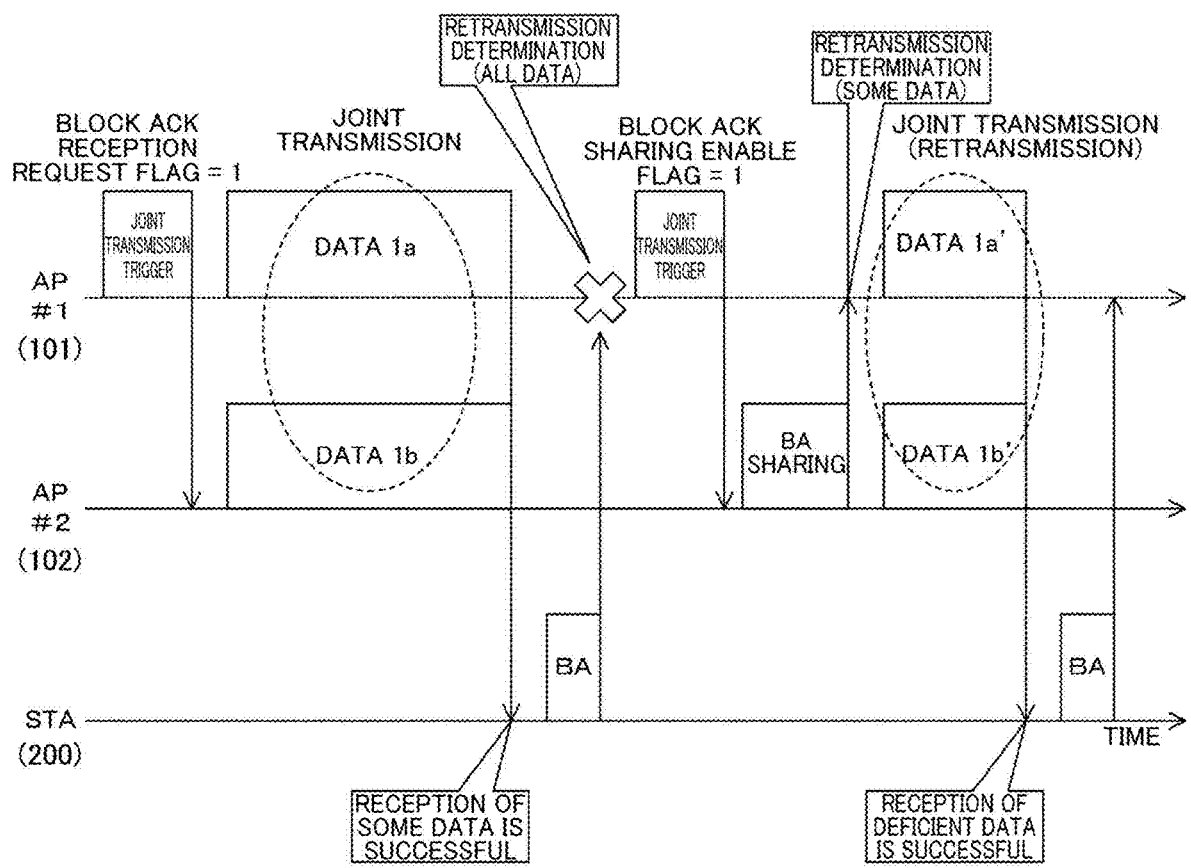
FIG. 17 is a diagram illustrating an operation example in which the access point 101 determines to reexamine retransmission data according to the embodiment of the present technology.

FIG. 17 is a diagram illustrating an operation example when the access point 101 determines to reexamine retransmission data according to the embodiment of the present technology.

An example will be assumed in which since the wireless terminal 200 successfully receives some of the data and the access point 101 has failed to receive the block ACK frame from the wireless terminal 200, the access point 101 erroneously determines to retransmit all the data. In this case, the access point 101 extracts only the data of which the reception has failed in the wireless terminal 200 and transmits the retransmission joint transmission trigger frame 760.

At this time, the access point 101 transmits the retransmission joint transmission trigger frame 760 in which the block ACK sharing enable flag 773 is set to "1" and acquires the block ACK sharing frame 790 from the access point 102. Thus, it is possible to correctly recognize the data of which the reception is successful in the wireless terminal 200 and the data of which the reception has failed in the wireless terminal 200, and thus it is possible to retransmit only the deficient data.

Figure 18:
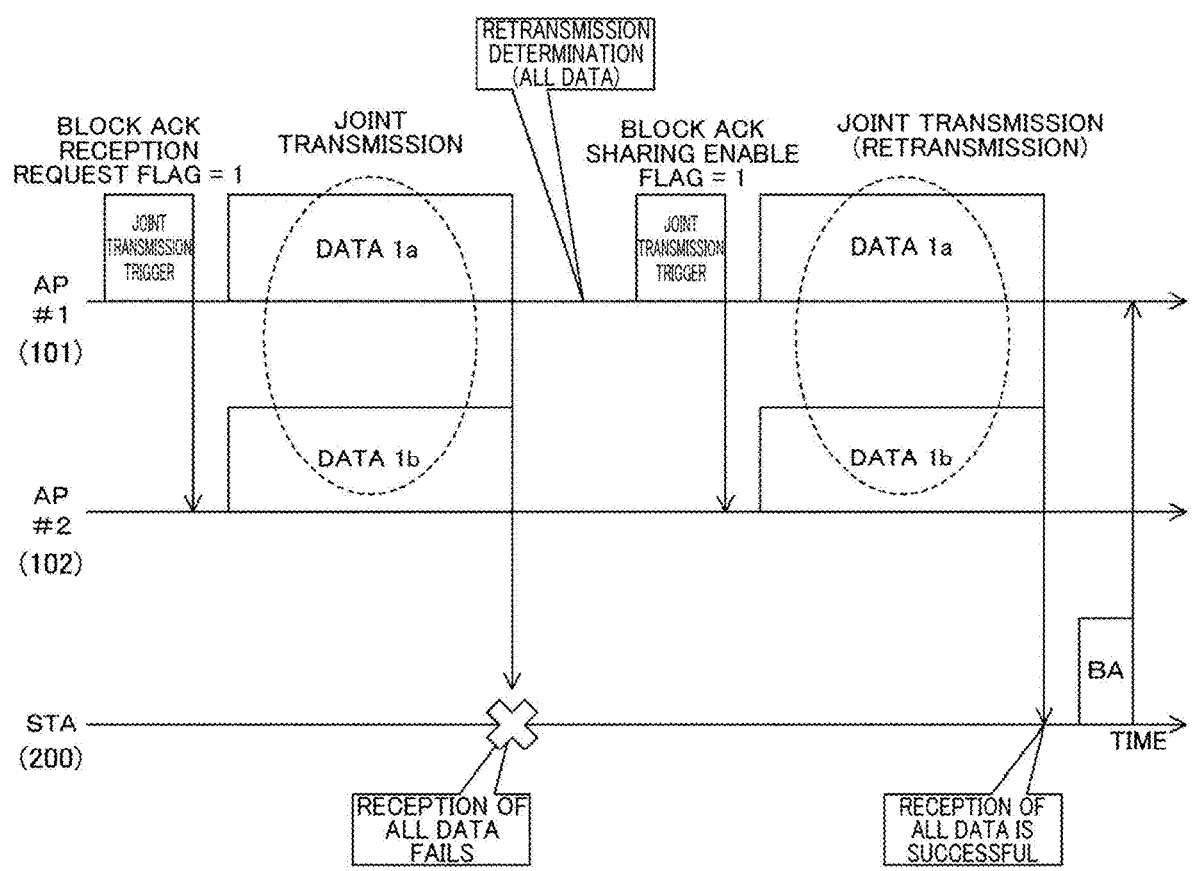
FIG. 18 is a diagram illustrating an operation example in which a wireless terminal 200 has failed to receive all the data according to the embodiment of the present technology.

FIG. 18 is a diagram illustrating an operation example when the wireless terminal 200 has failed to receive all the data according to the embodiment of the present technology.

When the wireless terminal 200 cannot receive all of the previous joint communication data, the access points 101 and 102 cannot receive the block ACK frame. Accordingly, although the access point 101 transmits the joint transmission trigger frame 760 in which the block ACK sharing enable flag 773 is set to "1" to the access point 102, the block ACK sharing frame 790 is not transmitted from the access point 102 and the joint communication is started as it is. In this way, when the wireless terminal 200 does not actually transmit the block ACK frame, the retransmission data can be jointly communicated as it is, and thus it is not necessary for the access point 101 to perform unnecessary processing for re-checking. Conversely, when only the access point 101 has failed to receive the block ACK frame, the block ACK information is shared from the access point 102. Therefore, it is possible to prevent unnecessary retransmission.

In this way, according to the first embodiment of the present technology, the block ACK from the wireless terminal 200 can be shared between the access points 101 and 102, and thus it is possible to avoid an unnecessary processing time or unnecessary retransmission.

2. Second Embodiment

In the above-described first embodiment, the access point 101 acquires the block ACK sharing frame 790 from the access point 102, but may acquire the block ACK from the wireless terminal 200. In a second embodiment, an example in which the block ACK is directly acquired from the wireless terminal 200 will be described. Since the overall configuration of the wireless communication system is the same as that of the above-described first embodiment, detailed description thereof will be omitted.

[Overall Sequence]

Figure 19:
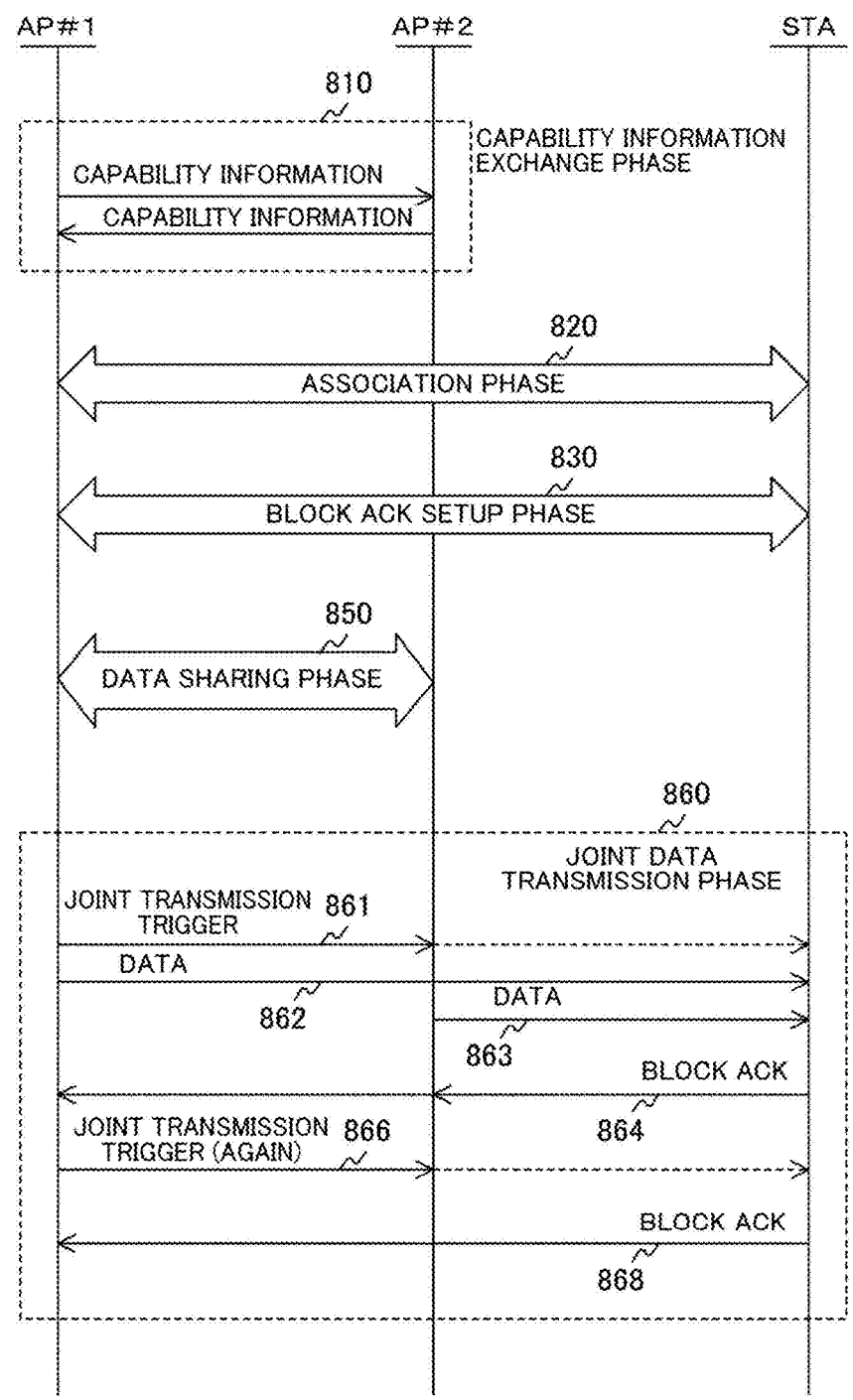
FIG. 19 is a diagram illustrating an example of an overall sequence of processing in a wireless communication system according to a second embodiment of the present technology.

FIG. 19 is a diagram illustrating an example of an overall sequence of processing in a wireless communication system according to a second embodiment of the present technology.

In the second embodiment, five phases, phases, the capability information exchange phase 810, the association phase 820, the block ACK setup phase 830, the data sharing phase 850, and the joint data transmission phase 860, are assumed. That is, compared to the above-described first embodiment, there is a difference in that the block ACK setup sharing phase 840 is not used.

In the joint data transmission phase 860, the joint transmission trigger frame 760 has a function of requesting retransmission of the block ACK from the wireless terminal 200. The wireless terminal 200 overhears the joint transmission trigger frame 760 (866) and retransmits the block ACK to the access point 101 as necessary (868). This point is different from the above-described first embodiment.

Figure 20:
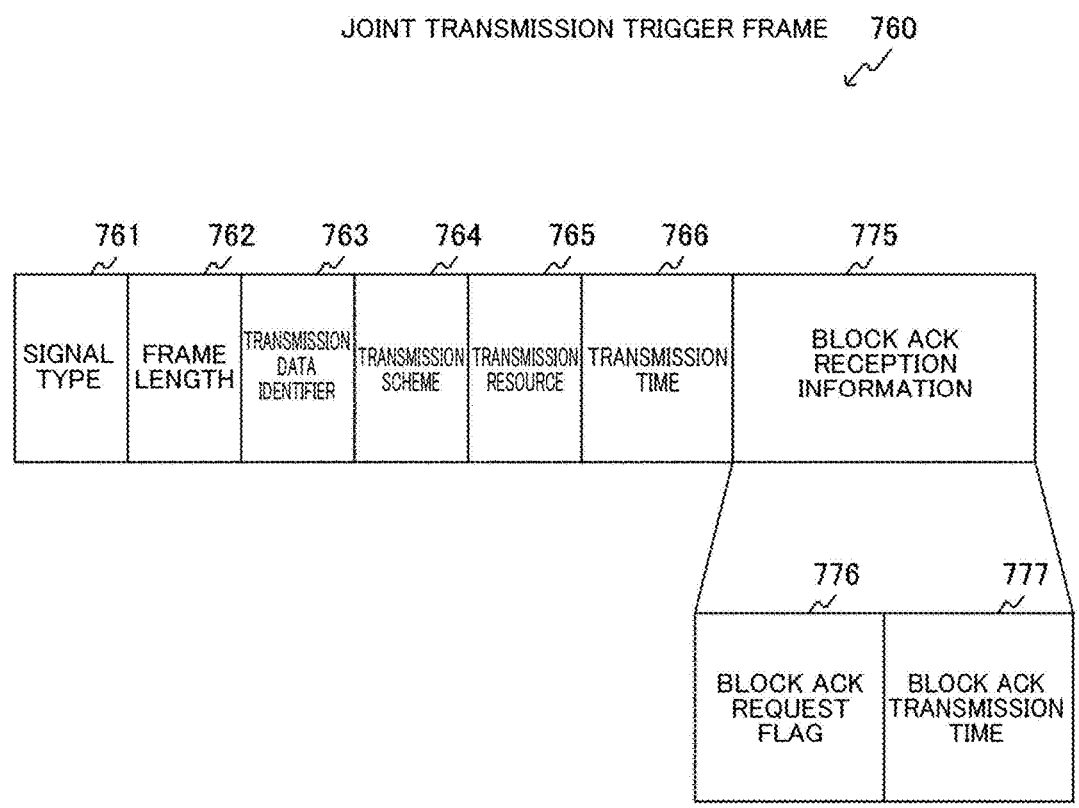
FIG. 20 is a diagram illustrating a field structure example of a joint transmission trigger frame 760 in a joint data transmission phase 860 according to the second embodiment of the present technology.

FIG. 20 is a diagram illustrating a field structure example of a joint transmission trigger frame 760 in a joint data transmission phase 860 according to the second embodiment of the present technology.

The joint transmission trigger frame 760 according to the second embodiment includes block ACK request information 775 instead of the block ACK reception request flag 771 and the block ACK sharing information 772 unlike the above-described first embodiment. The block ACK request information 775 includes a block ACK request flag 776 and a block ACK transmission time 777.

The block ACK request flag 776 is information regarding whether the wireless terminal 200 receiving the joint transmission trigger frame 760 is allowed to transmit the block ACK frame again when the acquired data is included in the data instructed to be retransmitted.

The block ACK transmission time (Block ACK Transmit Time) 777 is information regarding a transmission timing when the block ACK is transmitted again.

[Operation]

Figure 21:
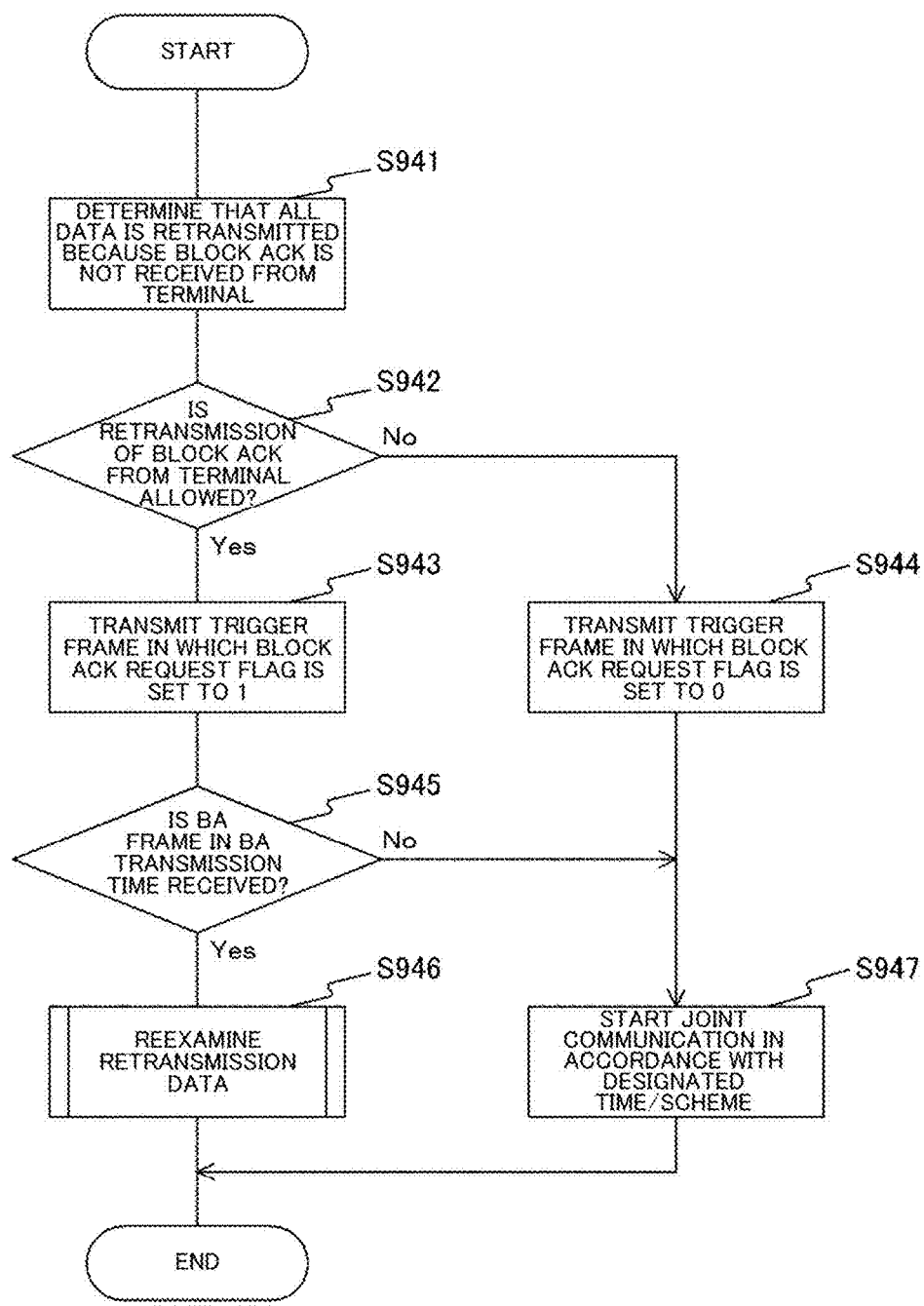
FIG. 21 is a flowchart illustrating a processing procedure example of retransmission determination processing in an access point 101 according to the second embodiment of the present technology.

FIG. 21 is a flowchart illustrating a processing procedure example of retransmission determination processing in an access point 101 according to the second embodiment of the present technology.

In the second embodiment, when retransmission of the block ACK frame from the wireless terminal 200 is requested (Yes in step S942), the joint transmission trigger frame 760 in which the block ACK request flag 776 is set to "1" is transmitted (step S943). Thus, the block ACK is retransmitted from the wireless terminal 200. The access point 101 receiving the block ACK from the wireless terminal 200 reexamines the retransmission data as in the above-described first embodiment (step S946).

Figure 22:
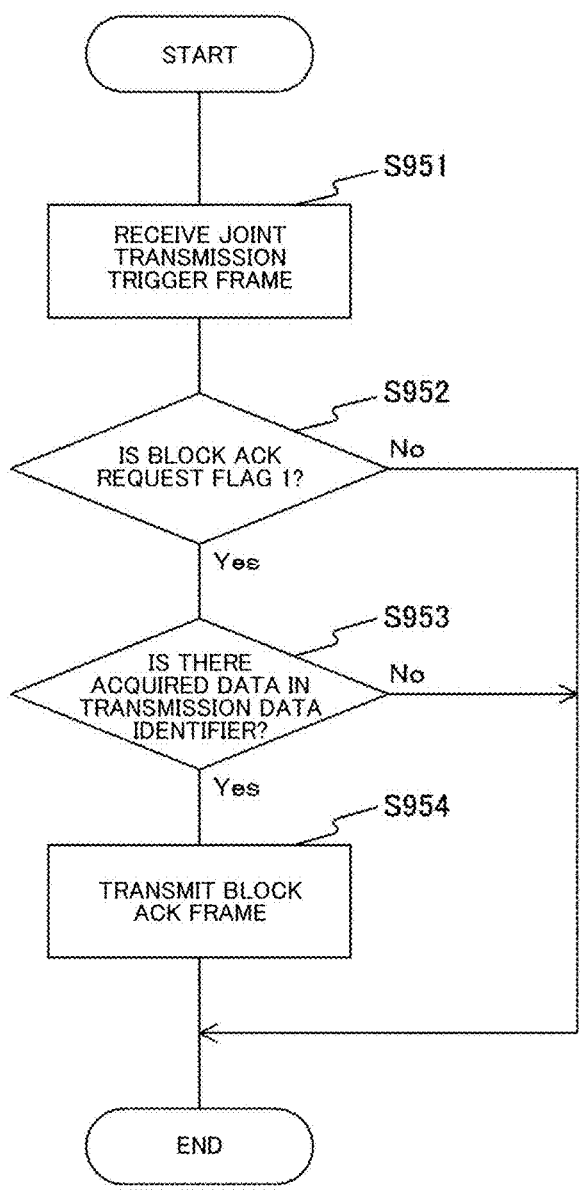
FIG. 22 is a flowchart illustrating a processing procedure example of reception processing of a joint transmission trigger frame 760 in a wireless terminal 200 according to the embodiment of the present technology.

FIG. 22 is a flowchart illustrating a processing procedure example of reception processing of the joint transmission trigger frame 760 in a wireless terminal 200 according to the embodiment of the present technology.

When the joint transmission trigger frame 760 is received (step S951) and when the block ACK request flag 776 is "1" (Yes in step S952) and the acquired data is included in the transmission data identifier 763 (Yes in step S953), the wireless terminal 200 transmits the block ACK frame at the time designated in the block ACK transmission time 777 (step S954).

Figure 23:
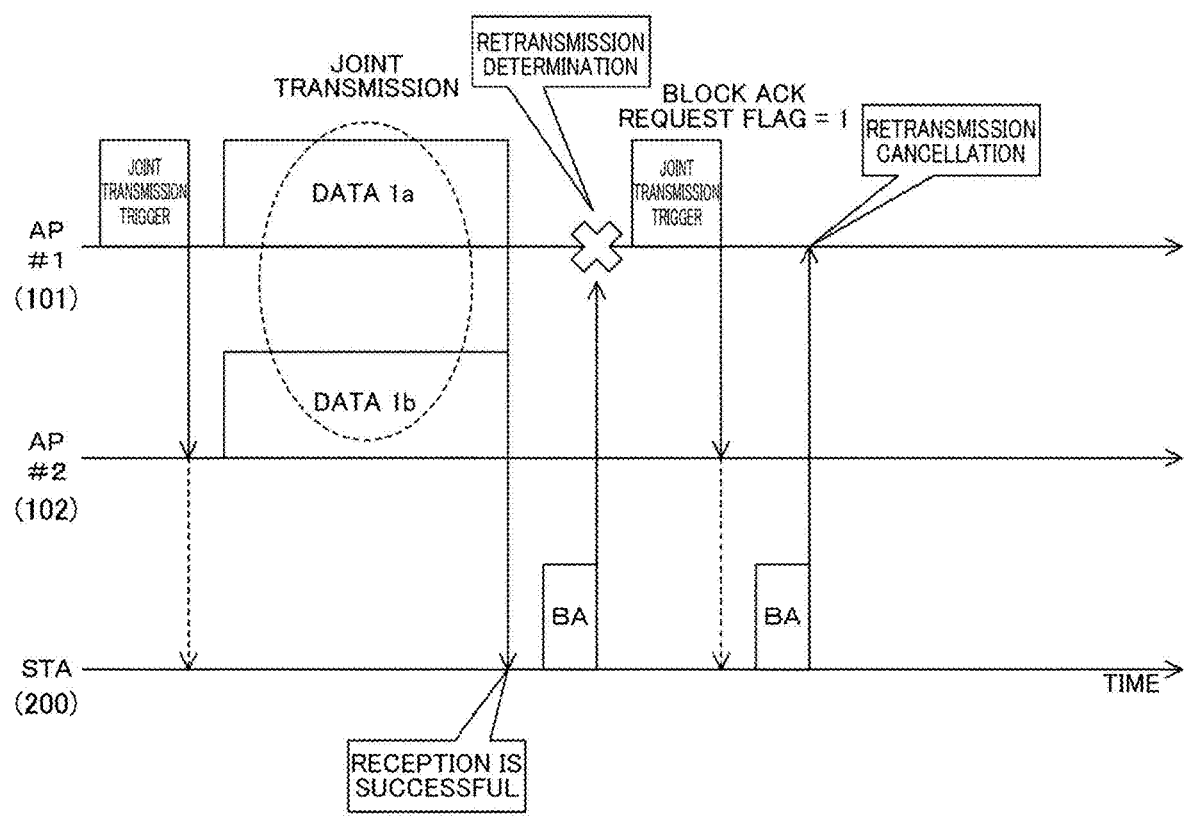
FIG. 23 is a diagram illustrating an operation example in which the access point 101 determines to cancel retransmission according to the second embodiment of the present technology.

FIG. 23 is a diagram illustrating an operation example when the access point 101 determines to cancel retransmission according to the second embodiment of the present technology.

In the second embodiment is different from the above-described first embodiment in that the wireless terminal 200 transmits the block ACK to the access point 101 again when the block ACK request flag 776 of the joint transmission trigger frame 760 is "1." Thus, it is possible to prevent erroneous retransmission.

In a state in which a chancel situation between the access point 101 and the wireless terminal 200 becomes worse for a long time, it is preferable to acquire the block ACK information from the access point 102 as in the above-described first embodiment. Conversely, when the channel situation is variable, the access point 102 may not perform special processing as long as the block ACK can be directly acquired from the wireless terminal 200.

In the second embodiment, the wireless terminal 200 does not retransmit the block ACK when the wireless terminal 200 has failed to receive the data, as in the above-described first embodiment. Accordingly, the joint communication of the retransmission data is started by the access points 101 and 102 as they are.

In the second embodiment, the example has been described in which the information for requesting the block ACK retransmission is included in the joint transmission trigger frame 760, but this can be performed simultaneously with the above-described first embodiment. For example, both the block ACK request information 775 and the block ACK sharing information 772 may be included in the joint transmission trigger frame 760 transmitted by the access point 101, and both the access point 102 and the wireless terminal 200 may notify of the block ACK information. In this case, it is necessary to designate the transmission time 766 so that each transmission timing is delayed.

In this way, according to the second embodiment of the present technology, it is possible to acquire the block ACK from the wireless terminal 200 again while avoiding an unnecessary processing time or unnecessary retransmission.

3. Third Embodiment

In the above-described first and second embodiments, the access point which is one of the access points performing the joint communication transmits the joint transmission trigger frame 760, but a third-party wireless communication device may transmit this frame. In a third embodiment, an example will be described in which a master access point that has a third-party role is assumed and the master access point transmits the joint transmission trigger frame 760.

[Wireless Communication System]

Figure 24:
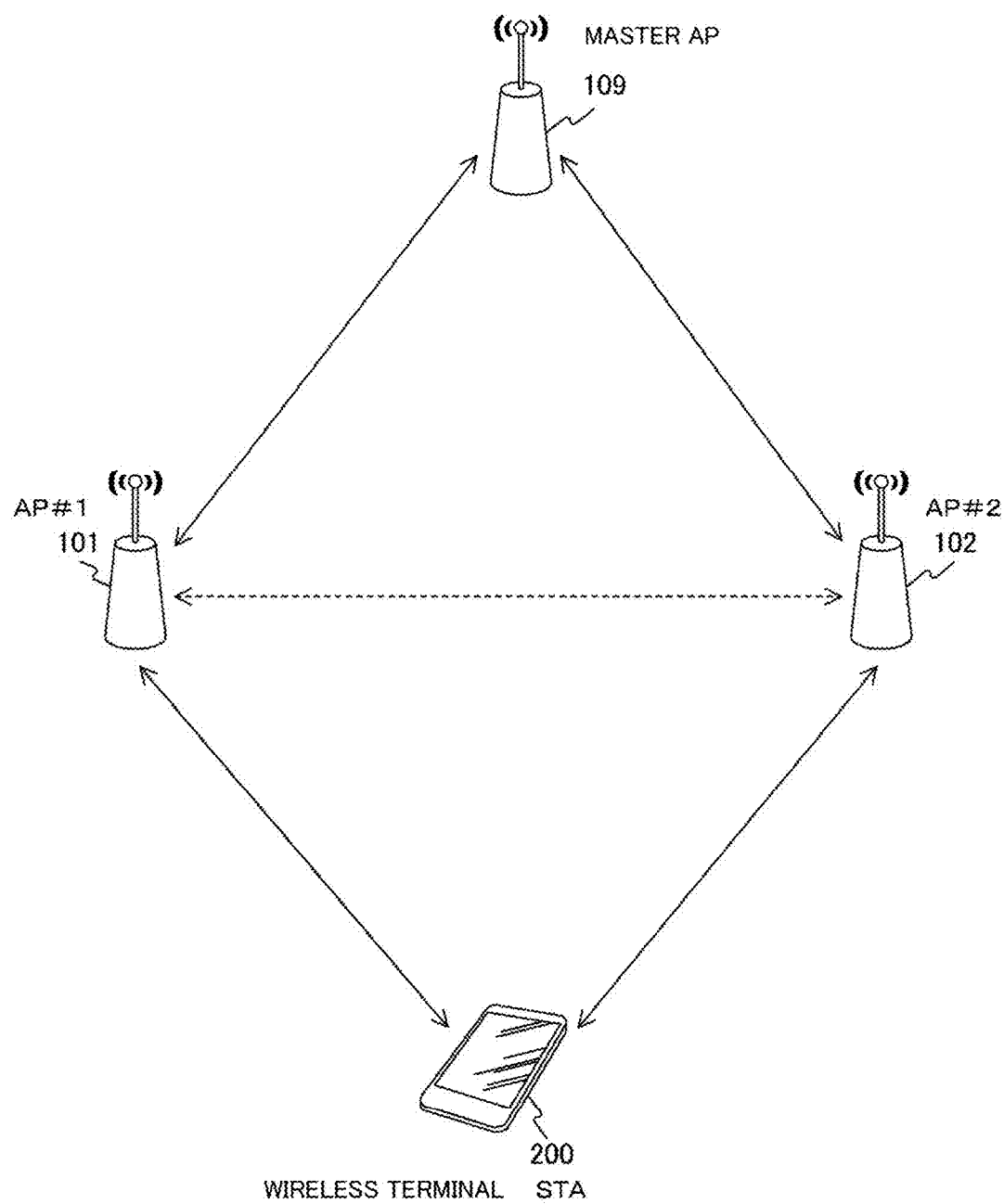
FIG. 24 is a diagram illustrating an example of an overall configuration of a wireless communication system according to a third embodiment of the present technology.

FIG. 24 is a diagram illustrating an example of an overall configuration of a wireless communication system according to the third embodiment of the present technology.

The wireless communication system is assumed to include a master access point (master AP) 109 in addition to the plurality of access points 101 and 102 and at least one wireless terminal 200.

The master access point 109 is connected to the access points 101 and 102 to transmit the joint transmission trigger frame 760. Therefore, in the third embodiment, the access points 101 and 102 do not transmit the joint transmission trigger frame 760 and the overall processing is led by the master access point 109.

[Overall Sequence]

Figure 25:
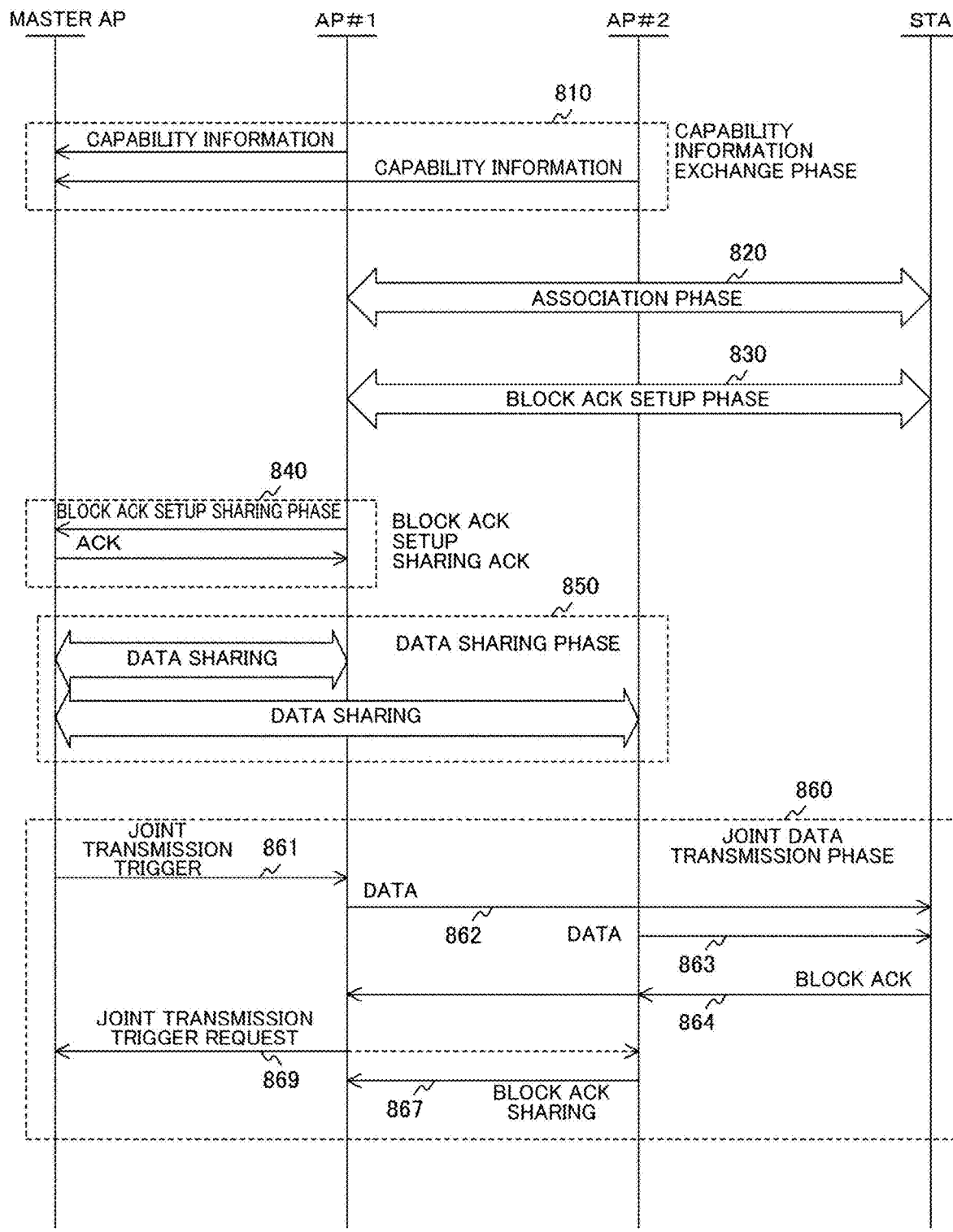
FIG. 25 is a diagram illustrating an example of an overall sequence of processing in a wireless communication system according to the third embodiment of the present technology.

FIG. 25 is a diagram illustrating an example of an overall sequence of processing in a wireless communication system according to the third embodiment of the present technology.

In the third embodiment, the six phases, the capability information exchange phase 810, the association phase 820, the block ACK setup phase 830, the block ACK setup sharing phase 840, the data sharing phase 850, and the joint data transmission phase 860, are assumed, as in the above-described first embodiment. Here, because of presence of the master access point 109, all the capability information or the block ACK setup information are collected in the master access point 109, and the joint transmission trigger frame 760 for giving an instruction of the joint communication is also transmitted from the master access point 109 (861).

The access point 101 requests the master access point 109 to transmit the joint transmission trigger frame 760 by transmitting a joint transmission trigger request frame to be described below (869). The access point 102 overhearing this request transmits the block ACK sharing frame 790 to the access point 101 (867).

[Frame Structure]

Figure 26:
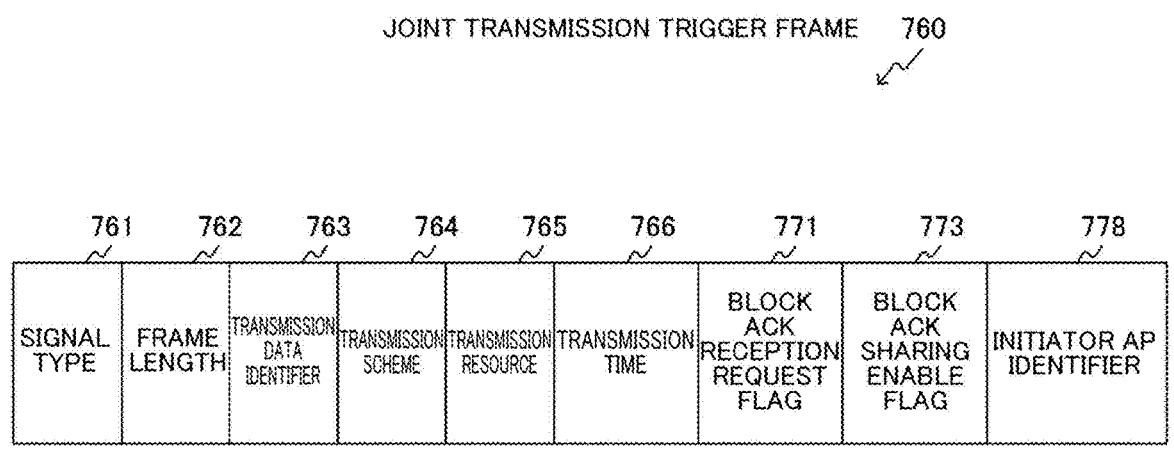
FIG. 26 is a diagram illustrating a field structure example of a joint transmission trigger frame 760 in a joint data transmission phase 860 according to the third embodiment of the present technology.

FIG. 26 is a diagram illustrating a field structure example of the joint transmission trigger frame 760 in the joint data transmission phase 860 according to the third embodiment of the present technology.

The joint transmission trigger frame 760 according to the third embodiment includes an initiator access point identifier 778 instead of the block ACK sharing transmission time 774 unlike the above-described first embodiment.

The initiator access point identifier (Initiator Access Point ID) 778 is information for identifying an initiator access point. The initiator access point is an access point that performs retransmission determination in the joint communication among the access points performing the joint communication and transmits a retransmission trigger request to the master access point 109. In this example, it is assumed that the access point 101 is designated as an initiator access point. Information designated with the initiator access point identifier 778 may be information which can be identified by the access point, such as a MAC address, a BSS color, or the like.

Figure 27:
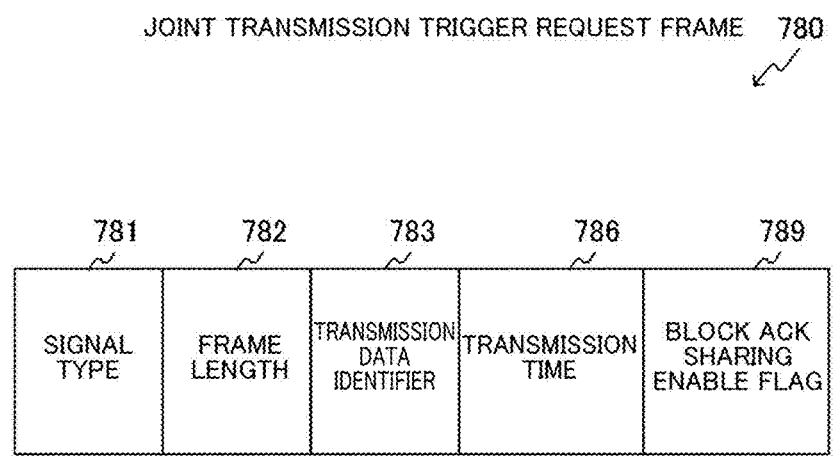
FIG. 27 is a diagram illustrating a field structure example of a joint transmission trigger request frame 780 in the joint data transmission phase 860 according to the third embodiment of the present technology.

FIG. 27 is a diagram illustrating a field structure example of a joint transmission trigger request frame 780 in the joint data transmission phase 860 according to the third embodiment of the present technology.

The joint transmission trigger request frame 780 includes a signal type 781, a frame length 782, a transmission data identifier 783, a transmission time 786, and a block ACK sharing enable flag 789.

The signal type 781 includes information indicating that this frame is the joint transmission trigger request frame 780. The frame length 782 includes information regarding a length of the frame.

The transmission data identifier 783 includes information for identifying data which is a transmission request target.

The transmission time 786 includes information regarding a transmission start time of the data which is the transmission request target.

The block ACK sharing enable flag 789 is information indicating whether the access point 102 overhearing the joint transmission trigger request frame 780 may transmit the block ACK sharing frame 790.

That is, in this example, the access point 101 notifies the master access point 109 of the transmission data identifier 783 and the transmission time 786 as information so that the joint transmission trigger frame 760 is transmitted to the master access point 109 again. The access point 102 can overhear the joint transmission trigger request frame 780. Thus, when the access point 102 is allowed in the block ACK sharing enable flag 789, the block ACK sharing frame 790 is transmitted to the access point 101.

Figure 28:
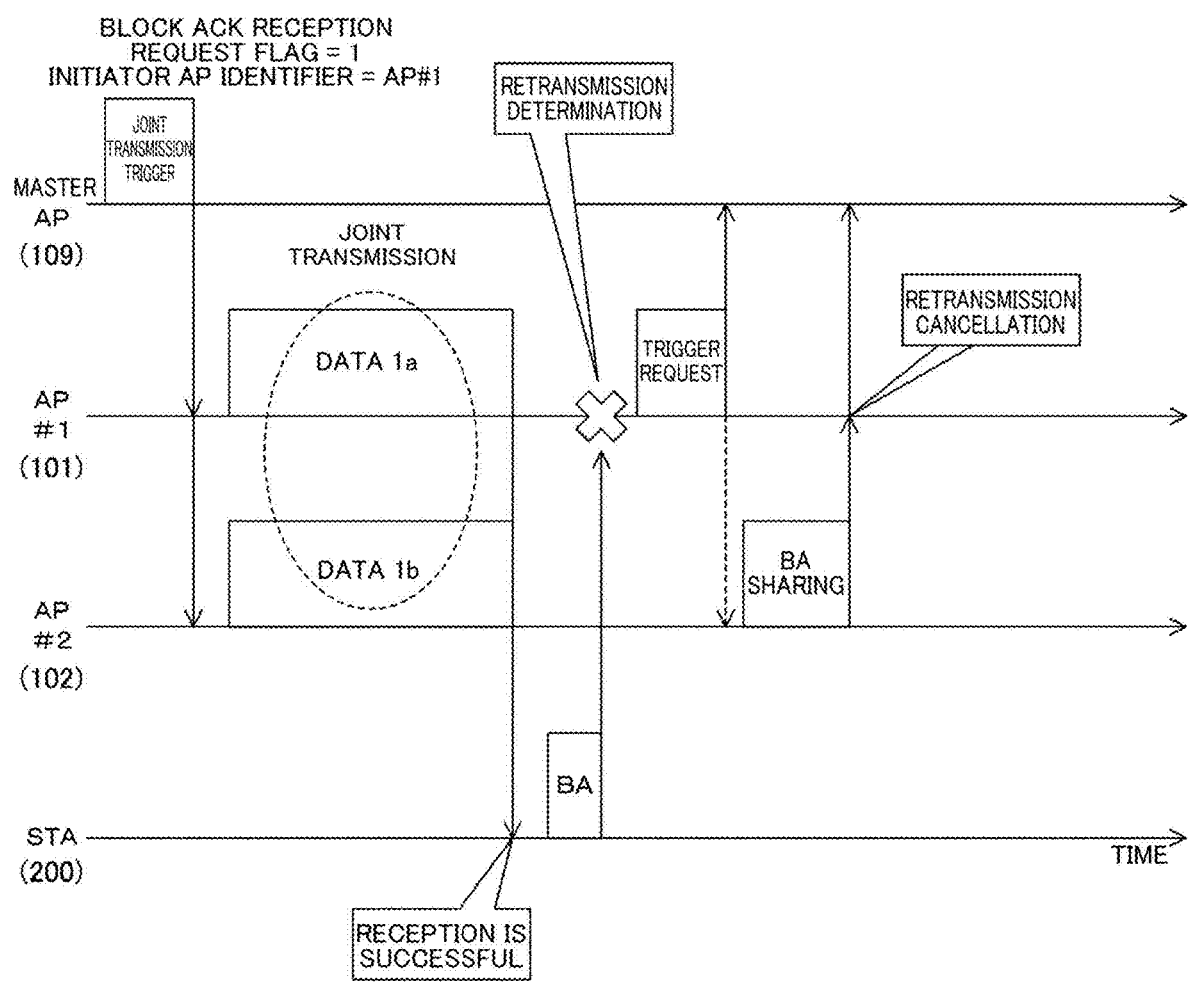
FIG. 28 is a diagram illustrating an operation example in which the access point 101 determines to cancel retransmission according to the third embodiment of the present technology.

FIG. 28 is a diagram illustrating an operation example when the access point 101 determines to cancel retransmission according to the third embodiment of the present technology.

In the third embodiment, as described above, the joint transmission trigger frame 760 transmitted by the master access point 109 includes the initiator access point identifier 778. With the initiator access point identifier 778, the access point performed the retransmission determination is designated between the access points 101 and 102.

In this example, the access point 101 is designated as the initiator access point, and performs the retransmission determination or makes a request for the trigger for the master access point 109. In this example, the retransmission is deleted in the retransmission determination of the access point 101.

In this way, according to the third embodiment of the present technology, when there is the master access point 109, the block ACK can be shared between the access points 101 and 102, and thus it is possible to avoid an unnecessary processing time or unnecessary retransmission.

4. Modification Examples

It may be designated whether the user determines to validate the functions described in the above-described embodiments. For example, the determination may be performed in accordance with a standard or may be performed for each application. For example, when the user performs real time gaming (RTG) with a terminal, the above-described functions may be validated by setting a low latency mode.

The above-described embodiments have been described as examples for realizing the present technology and matters in the embodiments and inventive specific matters in the claims have correspondence relations. Similarly, the inventive specific matters in the claims and matters of the embodiments of the present technology to which the same names are given have correspondence relations. Here, the present technology is not limited to the embodiments and various modifications of the embodiments can be made within the scope of the present technology without departing from the gist of the present technology.

The processing procedures in the above-described embodiments may be ascertained as methods including the series of procedures or may be ascertained as a program that causes a computer to perform the series of procedures or a recording medium that stores the program. As the recording medium, for example, a compact disc (CD), a mini-disc (MD), a digital versatile disc (DVD), a memory card, a Blu-ray (registered trademark) disc, or the like can be used.

The advantageous effects described in the present specification are merely exemplary and are not limitative, and other advantageous effects can be achieved.

The present technology can be configured as follows.

(1) A wireless communication device including:
a communication control unit configured to generate control information for requesting communication result information regarding whether reception is successful in a transmission destination device when first joint communication is performed jointly with another wireless communication device; and
a signal generation unit configured to generate a signal including the control information as a signal for urging second joint communication jointly with the other wireless communication device.

(2) The wireless communication device according to (1), wherein the communication control unit determines whether to perform retransmission in the second joint communication based on the communication result information.

(3) The wireless communication device according to (1) or (2), wherein the communication control unit performs control such that retransmission in the second joint communication is cancelled when the communication result information indicates that reception of all data is successful.

(4) The wireless communication device according to (1) or (2), wherein, when the communication result information indicates that the reception of some of the data is successful, the communication control unit specifies data indicating that reception of the communication result information has failed, and wherein the signal generation unit generates the signal including identification information of the specified data.

(5) The wireless communication device according to (1) or (2), wherein the communication control unit generates the signal including time information for requesting communication of the communication result information.

(6) The wireless communication device according to (5), wherein the communication control unit starts the second joint communication when the communication result information is could not be acquired within a time indicated by the time information.

(7) The wireless communication device according to any one of (1) to (6), wherein the communication control unit generates second control information for requesting acquisition of the communication result information from the other wireless communication device, and wherein the signal generation unit generates the signal further including the second control information.

(8) The wireless communication device according to (8), wherein the communication control unit generates the second control information when the communication control unit determines that the communication result information is acquirable based on capability information of the other wireless communication device.

(9) The wireless communication device according to (7), wherein the signal generation unit notifies the other wireless communication device of information necessary for the other wireless communication device to acquire the communication result information.

(10) The wireless communication device according to any one of (1) to (9), wherein the communication result information is transmitted from the other wireless communication device.

(11) The wireless communication device according to any one of (1) to (6), wherein the communication result information is transmitted from the transmission destination device.

(12) The wireless communication device according to any one of (1) to (9), wherein the control information further includes information for identifying a wireless communication device determining whether to perform retransmission in the second joint communication based on the communication result information.

(13) A wireless communication device comprising:
a communication control unit configured to generate control information for requesting another wireless communication device to retain communication result information regarding whether reception is successful in a transmission destination device when joint communication is performed jointly with the other wireless communication device; and
a signal generation unit configured to generate a signal including the control information as a signal for urging the joint communication.

(14) A wireless communication method for a wireless communication device, the method comprising:
a procedure in which a communication control unit generates control information for requesting communication result information regarding whether reception is successful in a transmission destination device when first joint communication is performed jointly with another wireless communication device; and
a procedure in which a signal generation unit generates a signal including the control information as a signal for urging second joint communication jointly with the other wireless communication device.

REFERENCE SIGNS LIST

100 Wireless communication device
101, 102 Access point
109 Master access point
110 Antenna
120 Wireless communication unit
130 Wireless signal processing unit
140 Wireless interface unit
150 Data processing unit
160 Communication control unit
170 Storage unit
200 Wireless terminal
810 Capability information exchange phase
820 Association phase
830 Block ACK setup phase
840 Block ACK setup sharing phase
850 Data sharing phase
860 Joint data transmission phase

The invention claimed is:

1. A wireless communication device comprising:
processing circuitry configured to:
generate control information for requesting communication result information regarding whether reception is successful in a transmission destination device when first joint communication is performed jointly with another wireless communication device; and
generate a signal including the control information for urging second joint communication jointly with the other wireless communication device, wherein the processing circuitry is configured to determine whether to perform retransmission in the second joint communication based, at least in part, on the requested communication result information.

2. The wireless communication device according to claim 1, wherein the processing circuitry is configured to perform control such that retransmission in the second joint communication is cancelled when the communication result information indicates that reception of all data is successful.

3. The wireless communication device according to claim 1, wherein, when the communication result information indicates that the reception of some of the data is successful, the processing circuitry is configured to specify data indicating that reception of the communication result information has failed, and to generate the signal including identification information of the specified data.

4. The wireless communication device according to claim 1, wherein the processing circuitry is configured to generate the signal including time information for requesting communication of the communication result information.

5. The wireless communication device according to claim 4, wherein the processing circuitry is configured to start the second joint communication when the communication result information could not be acquired within a time indicated by the time information.

6. The wireless communication device according to claim 1, wherein the processing circuitry is configured to generate second control information for requesting acquisition of the communication result information from the other wireless communication device, and to generate the signal further including the second control information.

7. The wireless communication device according to claim 6, wherein the processing circuitry is configured to generate the second control information when the processing circuitry determines that the communication result information is acquirable based on capability information of the other wireless communication device.

8. The wireless communication device according to claim 6, wherein the processing circuitry is configured to notify the other wireless communication device of information necessary for the other wireless communication device to acquire the communication result information.

9. The wireless communication device according to claim 1, wherein the communication result information is transmitted from the other wireless communication device.

10. The wireless communication device according to claim 1, wherein the communication result information is transmitted from the transmission destination device.

11. The wireless communication device according to claim 1, wherein the control information further includes information for identifying a wireless communication device determining whether to perform retransmission in the second joint communication based on the communication result information.

12. A wireless communication device comprising:
processing circuitry configured to:
generate control information for requesting another wireless communication device to retain communication result information regarding whether reception is successful in a transmission destination device when joint communication is performed jointly with the other wireless communication device; and
generate a signal including the control information for urging the joint communication, wherein the communication result information includes acknowledgement sharing information.

13. A wireless communication method executed by a wireless communication device, the method comprising:
generating control information for requesting communication result information regarding whether reception is successful in a transmission destination device when first joint communication is performed jointly with another wireless communication device;
generating a signal including the control information for urging second joint communication jointly with the other wireless communication device; and
determining whether to perform retransmission in the second joint communication based, at least in part, on the requested communication result information.

14. The wireless communication device according to claim 1, wherein the communication result information indicates that the other wireless communication device received an acknowledgement of the first joint communication from the transmission destination device.

15. The wireless communication device according to claim 1, wherein the communication result information is received from the other wireless communication device.

16. The wireless communication device according to claim 1, wherein the communication result information includes acknowledgement sharing information.

* * * * *